US011115759B1

(12) United States Patent
Olah

(10) Patent No.: US 11,115,759 B1
(45) Date of Patent: Sep. 7, 2021

(54) SYSTEM AND METHOD FOR AIDING HEARING

(71) Applicant: Texas Institute of Science, Inc., Richardson, TX (US)

(72) Inventor: Laslo Olah, Richardson, TX (US)

(73) Assignee: Texas Institute of Science, Inc., Richardson, TX (US)

( * ) Notice: Subject to any disclaimer, the term of this patent is extended or adjusted under 35 U.S.C. 154(b) by 0 days.

(21) Appl. No.: 17/343,329

(22) Filed: Jun. 9, 2021

Related U.S. Application Data

(63) Continuation-in-part of application No. PCT/US2021/029414, filed on Apr. 27, 2021, which is a continuation of application No. 17/029,764, filed on Sep. 23, 2020, now Pat. No. 10,993,047, which is a continuation-in-part of application No. 17/026,955, filed on Sep. 21, 2020, now Pat. No. 11,102,589, and a continuation-in-part of application No. 16/959,972, filed as application No. PCT/US2019/012550 on Jan. 7, 2019.

(Continued)

(51) Int. Cl.
*H04R 25/00* (2006.01)
*G10L 25/51* (2013.01)
*G06F 3/16* (2006.01)
*H04B 1/3827* (2015.01)

(52) U.S. Cl.
CPC ............. *H04R 25/50* (2013.01); *G06F 3/162* (2013.01); *G10L 25/51* (2013.01); *H04B 1/3827* (2013.01); *H04R 2225/41* (2013.01); *H04R 2225/55* (2013.01)

(58) Field of Classification Search
CPC ... H04R 25/30; H04R 25/554; H04R 2225/55
See application file for complete search history.

(56) References Cited

U.S. PATENT DOCUMENTS

| 5,987,147 A | 11/1999 | Nishimoto |
| 7,113,589 B2 | 9/2006 | Mitchler |

(Continued)

FOREIGN PATENT DOCUMENTS

| KR | 20170026786 | 3/2017 |
| WO | 2019136382 | 7/2019 |

OTHER PUBLICATIONS

International Preliminary Report on Patentability—PCT/US2019/012550.
International Search Report—PCT/US2019/012550.

*Primary Examiner* — Brian Ensey
(74) *Attorney, Agent, or Firm* — Scott Griggs; Griggs Bergen LLP

(57) ABSTRACT

A system and method for aiding hearing are disclosed. In one embodiment of the system, a programming interface is configured to communicate with a device. The system screens, via a speaker and a user interface associated with the device, a left ear—and separately, a right ear—of a patient. The system then determines a left ear hearing range and a right ear hearing range. The screening utilizes harmonic frequencies of a harmonic frequency series, where the harmonic frequency series includes a fundamental frequency and integer multiples of the fundamental frequency. In some embodiments, the harmonic frequencies may include classical music instrument sounds.

21 Claims, 10 Drawing Sheets

Related U.S. Application Data

(60) Provisional application No. 62/935,961, filed on Nov. 15, 2019, provisional application No. 62/904,616, filed on Sep. 23, 2019, provisional application No. 62/613,804, filed on Jan. 5, 2018.

(56) References Cited

U.S. PATENT DOCUMENTS

| | | | |
|---|---|---|---|
| 8,565,460 B2 | 10/2013 | Takagi et al. | |
| 8,761,421 B2 * | 6/2014 | Apfel | H04R 25/70 |
| | | | 381/315 |
| 9,232,322 B2 | 1/2016 | Fang | |
| 9,344,814 B2 | 5/2016 | Rasmussen | |
| 9,468,401 B2 * | 10/2016 | Van Hasselt | H04R 25/00 |
| 9,712,928 B2 | 7/2017 | Pedersen et al. | |
| 10,181,328 B2 | 1/2019 | Jensen et al. | |
| 10,993,047 B2 | 4/2021 | Olah et al. | |
| 2013/0223661 A1 | 8/2013 | Uzuanis | |
| 2017/0071534 A1 | 3/2017 | Zhao et al. | |
| 2019/0253818 A1 | 8/2019 | Vonlanthem et al. | |
| 2021/0021941 A1 | 1/2021 | Olah et al. | |

\* cited by examiner

SYSTEM AND METHOD FOR AIDING HEARING

PRIORITY STATEMENT & CROSS-REFERENCE TO RELATED APPLICATIONS

This application is a continuation-in-part of co-pending International Application No. PCT/US21/29414, entitled "System and Method for Aiding Hearing" and filed on Apr. 27, 2021 in the names of Laslo Olah et al.; which claims priority from U.S. patent application Ser. No. 17/029,764, entitled "System and Method for Aiding Hearing" and filed on Sep. 23, 2020, in the names of Laslo Olah et al., now U.S. Pat. No. 10,993,047, issued on Apr. 27, 2021; which is a continuation-in-part of co-pending U.S. patent application Ser. No. 17/026,955, entitled "Hearing Aid and Method for Use of Same" and filed on Sep. 21, 2020, in the names of Laslo Olah et al.; which claims the benefit of priority from (1) U.S. Provisional Patent Application No. 62/935,961, entitled "Hearing Aid and Method for Use of Same" and filed on Nov. 15, 2019 in the name of Laslo Olah; and (2) U.S. Provisional Patent Application No. 62/904,616, entitled "Hearing Aid and Method for Use of Same" and filed on Sep. 23, 2019, in the name of Laslo Olah; all of which are hereby incorporated by reference, in entirety, for all purposes. U.S. patent application Ser. No. 17/026,955, entitled "Hearing Aid and Method for Use of Same" and filed on Sep. 21, 2020, in the names of Laslo Olah et al. is also a continuation-in-part of co-pending U.S. patent application Ser. No. 16/959,972, entitled "Hearing Aid and Method for Use of Same" and filed on Jul. 2, 2020 in the name of Laslo Olah; which claims priority from International Application No. PCT/US19/12550, entitled "Hearing Aid and Method for Use of Same" and filed on Jan. 7, 2019 in the name of Laslo Olah; which claims priority from U.S. Provisional Patent Application No. 62/613,804, entitled "Hearing Aid and Method for Use of Same" and filed on Jan. 5, 2018 in the name of Laslo Olah; all of which are hereby incorporated by reference, in entirety, for all purposes.

TECHNICAL FIELD OF THE INVENTION

This invention relates, in general, to hearing aids and, in particular, to systems and methods that aid hearing to provide signal processing and feature sets to enhance speech and sound intelligibility.

BACKGROUND OF THE INVENTION

Hearing loss can affect anyone at any age, although elderly adults more frequently experience hearing loss. Untreated hearing loss is associated with lower quality of life and can have far-reaching implications for the individual experiencing hearing loss as well as those close to the individual. As a result, there is a continuing need for improved hearing aids and methods for use of the same that enable patients to better hear conversations and the like.

SUMMARY OF THE INVENTION

It would be advantageous to achieve a hearing aid and method for use of the same that would significantly change the course of existing hearing aids by adding features to correct existing limitations in functionality. It would also be desirable to enable a mechanical and electronics-based solution that would provide enhanced performance and improved usability with an enhanced feature set. To better address one or more of these concerns, a system and method for aiding hearing are disclosed. In one embodiment of the system, a programming interface is configured to communicate with a device. The system screens, via a speaker and a user interface associated with the device, a left ear and separately, a right ear—of a patient. The system then determines a left ear hearing range and a right ear hearing range. The screening utilizes harmonic frequencies of a harmonic frequency series, where the harmonic frequency series includes a fundamental frequency and integer multiples of the fundamental frequency. In some embodiments, the harmonic frequencies may include classical music instrument sounds.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
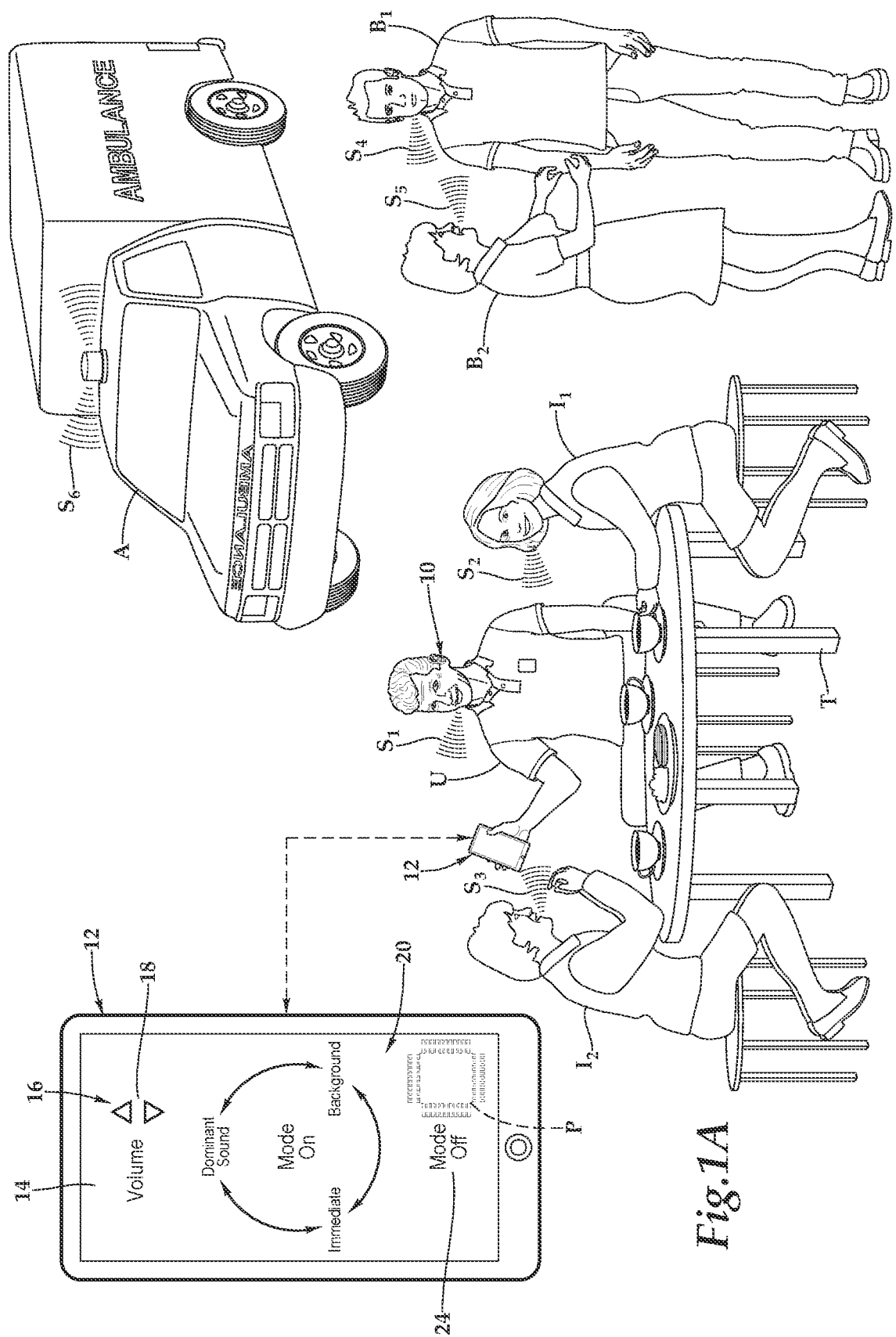
FIG. 1A is a front perspective schematic diagram depicting one embodiment of a hearing aid programmed with one embodiment of a system for aiding hearing, according to the teachings presented herein.
Figure 1B:
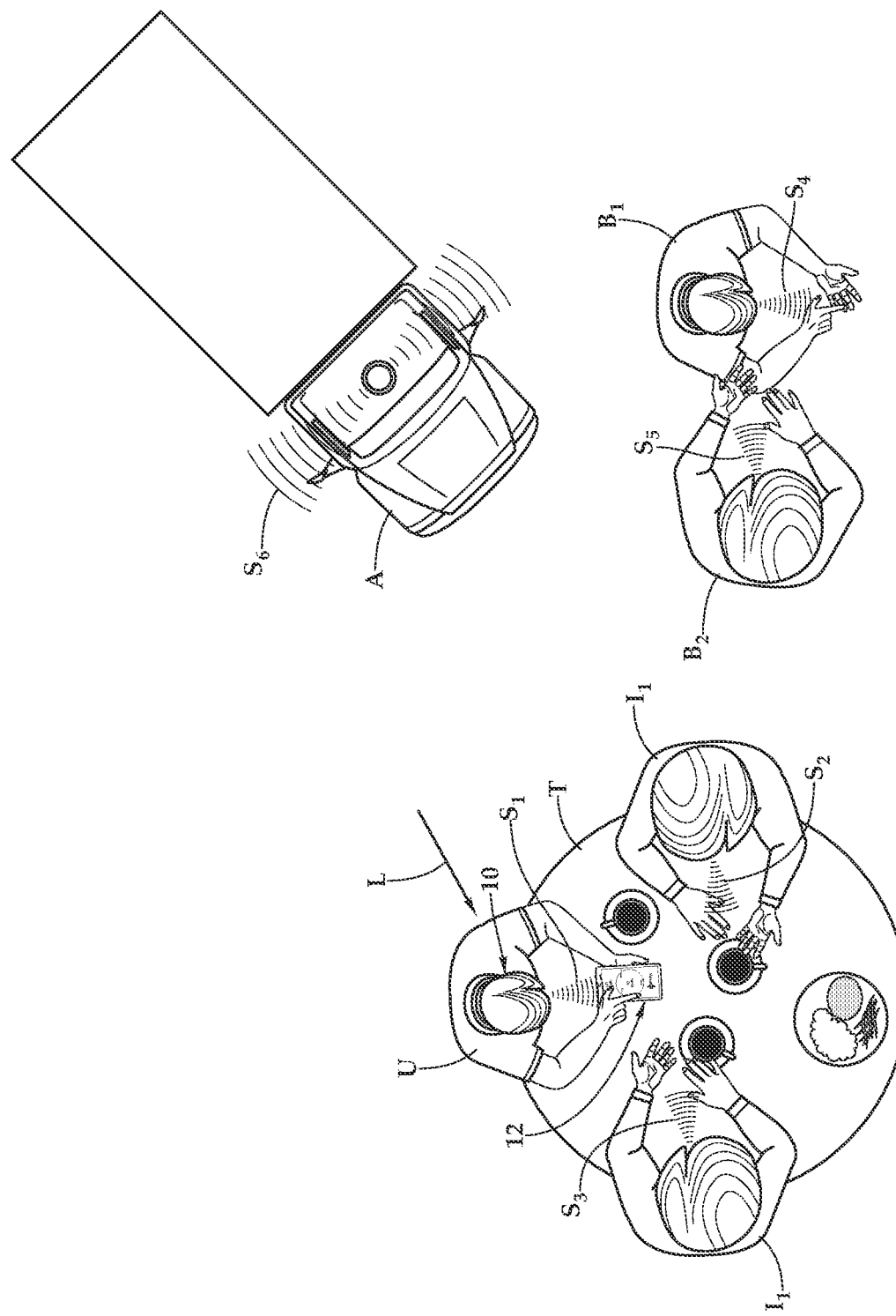
FIG. 1B is a top plan schematic diagram depicting the hearing aid of FIG. 1A being utilized according to the teachings presented herein.

Referring initially to FIG. 1A and FIG. 1B, therein is depicted one embodiment of a hearing aid, which is schematically illustrated and designated 10. The hearing aid 10 is programmed according to a system for aiding hearing. As shown, a user U, who may be considered a patient requiring a hearing aid, is wearing the hearing aid 10 and sitting at a table T at a restaurant or café, for example, and engaged in a conversation with an individual $I_1$ and an individual $I_2$. As part of a conversation at the table T, the user U is speaking sound $S_1$, the individual $I_1$ is speaking sound $S_2$, and the individual $I_2$ is speaking sound $S_3$. Nearby, in the background, a bystander $B_1$ is engaged in a conversation with a bystander $B_2$. The bystander $B_1$ is speaking sound $S_4$ and the bystander $B_2$ is speaking sound $S_5$. An ambulance A is driving by the table T and emitting sound $S_6$ in direction L. The sounds $S_1$, $S_2$, and $S_3$ may be described as the immediate background sounds. The sounds $S_4$, $S_5$, and $S_6$ may be described as the background sounds. The sound $S_6$ may be described as the dominant sound as it is the loudest sound at table T. The sounds $S_1$, $S_2$, $S_3$, $S_4$, $S_5$, $S_6$ represent life sounds with are complex and continuously changing mixtures of base frequencies and harmonics. The sounds $S_1$, $S_2$, $S_3$, $S_4$, $S_5$, $S_6$ are not discrete frequencies.

As will be described in further detail hereinbelow, the hearing aid 10 is programmed with a preferred hearing range for each ear in a two-ear embodiment and for one ear in a one-ear embodiment. The preferred hearing range may be a range of sound corresponding to the highest hearing capacity of an ear of the user U between 50 Hz and 5,000 Hz or between 50 Hz and 10,000 Hz, for example. Further, as shown, in the two-ear embodiment, the preferred hearing range for each ear may be multiple ranges of sound corresponding to the highest hearing capacity ranges of an ear of the user U between 50 Hz and 5,000 Hz or between 50 Hz and 10,000 Hz, for example. In some embodiments of this multiple range of sound implementation, the various sounds $S_1$, $S_2$, $S_3$, $S_4$, $S_5$, $S_6$ received may be transformed and divided into the multiple ranges of sound.

In some embodiments, as will be discussed in further detail hereinbelow, a left ear hearing range and a right ear hearing range are determined by way of screening. The screening utilizes harmonic frequencies of a harmonic frequency series, where the harmonic frequency series includes a fundamental frequency and integer multiples of the fundamental frequency. In some embodiments, the harmonic frequencies may include classical music instrument sounds.

As will be discussed in additional detail hereinbelow, by programming the hearing aid 10 with an algorithm based on screening utilizing harmonic frequencies of a harmonic frequency series, the testing identifies a preferred hearing range for a patient, on an ear-by-ear basis, with the use of life-sounds, rather than clinical discrete frequencies.

In one embodiment, the hearing aid 10 may create a pairing with a proximate smart device 12, such as a smart phone (depicted), smart watch, or tablet computer. The proximate smart device 12 includes a display 14 having an interface 16 having controls, such as an ON/OFF switch or volume controls 18, mode of operation controls 24, general controls 20. The user U may send a control signal wirelessly from the proximate smart device 12 to the hearing aid 10 to control a function, like the volume controls 18. Further, in one embodiment, as shown by a processor symbol P, after the hearing aid 10 creates the pairing with the proximate smart device 12, the hearing aid 10 and the proximate smart device 12 may leverage the wireless communication link therebetween and use processing distributed between the hearing aid 10 and the proximate smart device 12 to process the signals and perform other analysis.

Figure 2:
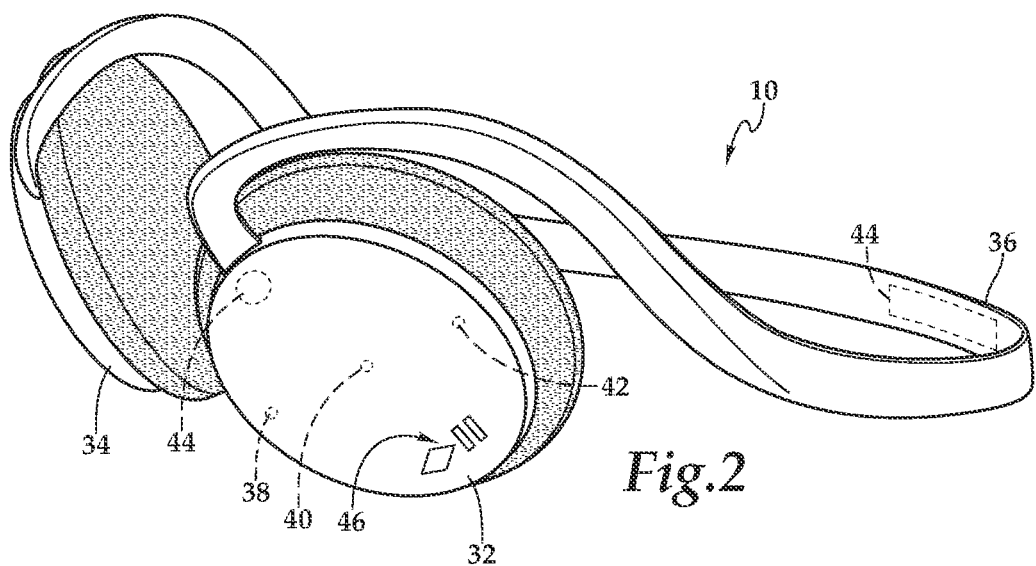
FIG. 2 is a front perspective view of one embodiment of the hearing aid depicted in FIG. 1A.

Referring to FIG. 2, as shown, in the illustrated embodiment, the hearing aid 10 is programmed according to the system for aiding hearing and the hearing aid 10 includes a left body 32 and a right body 34 connected to a band member 36 that is configured to partially circumscribe the user U. Each of the left body 32 and the right body 34 cover an external ear of the user U and are sized to engage therewith. In some embodiments, microphones 38, 40, 42, which gather sound directionally and convert the gathered sound into an electrical signal, are located on the left body 32. With respect to gathering sound, the microphone 38 may be positioned to gather forward sound, the microphone 40 may be positioned to gather lateral sound, and the microphone 42 may be positioned to gather rear sound. Microphones may be similarly positioned on the right body 34. Various internal compartments 44 provide space for housing electronics, which will be discussed in further detail hereinbelow. Various controls 46 provide a patient interface with the hearing aid 10.

Having each of the left body 32 and the right body 34 cover an external ear of the user U and being sized to engage therewith confers certain benefits. Sound waves enter through the outer ear and reach the middle ear to vibrate the eardrum. The eardrum then vibrates the oscilles, which are small bones in the middle ear. The sound vibrations travel through the oscilles to the inner ear. When the sound vibrations reach the cochlea, they push against specialized cells known as hair cells. The hair cells turn the vibrations into electrical nerve impulses. The auditory nerve connects the cochlea to the auditory centers of the brain. When these electrical nerve impulses reach the brain, they are experienced as sound. The outer ear serves a variety of functions. The various air-filled cavities composing the outer ear, the two most prominent being the concha and the ear canal, have a natural or resonant frequency to which they respond best. This is true of all air-filled cavities. The resonance of each of these cavities is such that each structure increases the sound pressure at its resonant frequency by approximately 10 to 12 dB. In summary, among the functions of the outer ear: (a) boost or amplify high-frequency sounds; (b) provide the primary cue for the determination of the elevation of a sound's source; (c) assist in distinguishing sounds that arise from in front of the listener from those that arise from behind the listener. Headsets are used in hearing testing in medical and associated facilities for a reason: tests have shown that completely closing the ear canal in order to prevent any form of outside noise plays direct role in acoustic matching. The more severe hearing problem, the closer the hearing aid speaker must be to the ear drum. However, the closer to the speaker is to the ear drum, the more the device plugs the canal and negatively impacts the ear's pressure system. That is, the various chambers of the ear have a defined operational pressure determined, in part, by the ear's structure. By plugging the ear canal, the pressure system in the ear is distorted and the operational pressure of the ear is negatively impacted.

As alluded, "plug size" hearing aids having limitations with respect to distorting the defined operational pressure within the ear. Considering the function of the outer ear's air filled cavities in increasing the sound pressure at resonant frequencies, the hearing aid 10 of FIG. 2—and other figures—creates a closed chamber around the ear increasing the pressure within the chamber. This higher pressure plus the utilization of a more powerful speaker within the headset at qualified sound range, e.g., the frequency range the user hears best with the best quality sound, provide the ideal set of parameters for a powerful hearing aid.

Figure 3A:
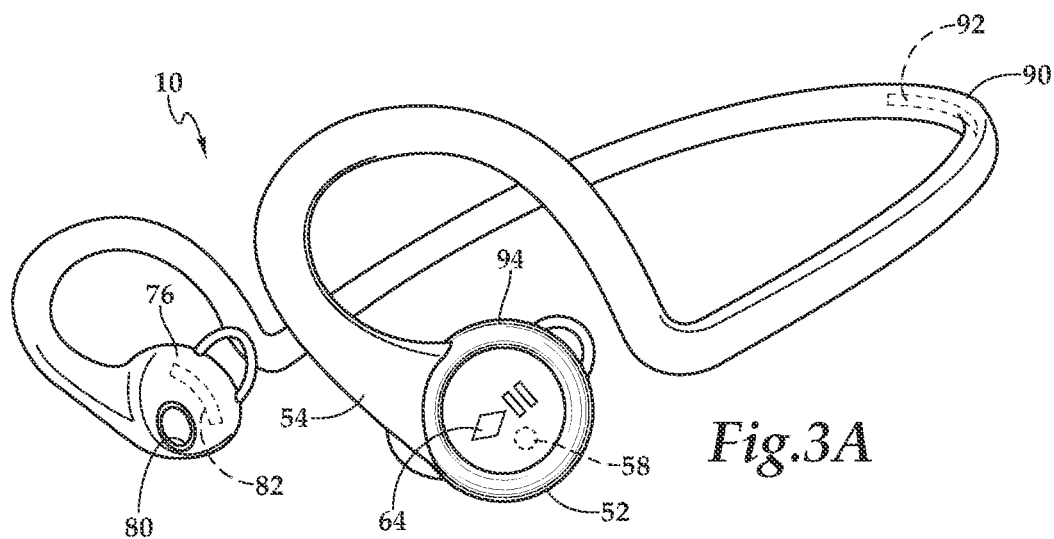
FIG. 3A is a front-left perspective view of another embodiment of the hearing aid depicted in FIG. 1A.
Figure 3B:
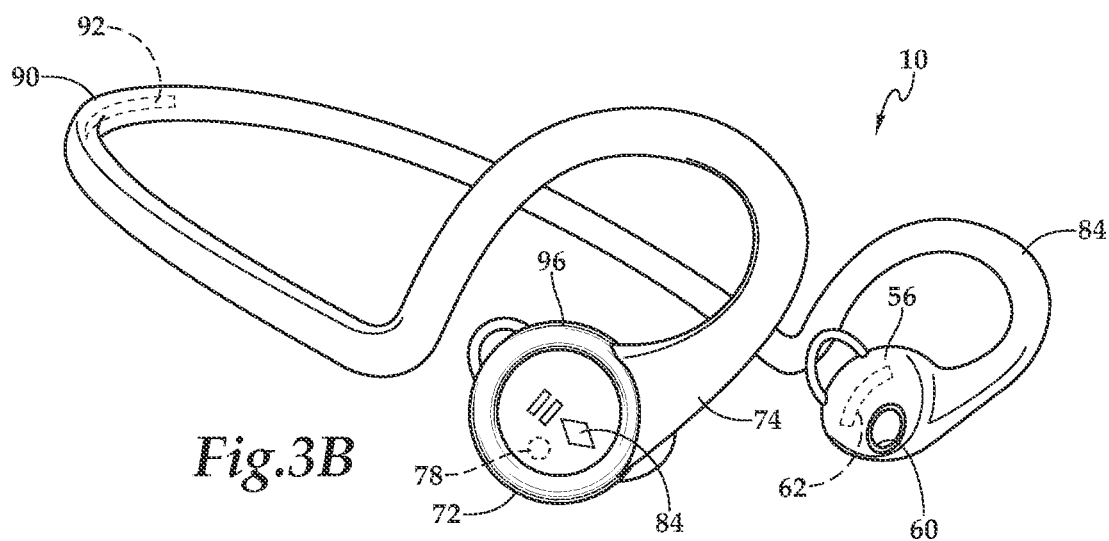
FIG. 3B is a front-right perspective view of the embodiment of the hearing aid depicted in FIG. 3A.

Referring to FIG. 3A and FIG. 3B, as shown, in the illustrated embodiment, the hearing aid 10 is programmed according to a system for aiding hearing. The hearing aid 10 includes a left body 52 having an ear hook 54 extending from the left body 52 to an ear mold 56. The left body 52 and the ear mold 56 may each at least partially conform to the contours of the external ear and sized to engage therewith. By way of example, the left body 52 may be sized to engage with the contours of the ear in a behind-the-ear-fit. The ear mold 56 may be sized to be fitted for the physical shape of a patient's ear. The ear hook 54 may include a flexible tubular material that propagates sound from the left body 52 to the ear mold 56. Microphones 58, which gather sound and convert the gathered sound into an electrical signal, are located on the left body 52. An opening 60 within the ear mold 56 permits sound traveling through the ear hook 54 to exit into the patient's ear. An internal compartment 62 provides space for housing electronics, which will be discussed in further detail hereinbelow. Various controls 64 provide a patient interface with the hearing aid 10 on the left body 52 of the hearing aid 10.

As also shown, the hearing aid 10 includes a right body 72 having an ear hook 74 extending from the right body 72 to an ear mold 76. The right body 72 and the ear mold 76 may each at least partially conform to the contours of the external ear and sized to engage therewith. By way of example, the right body 72 may be sized to engage with the contours of the ear in a behind-the-ear-fit. The ear mold 76 may be sized to be fitted for the physical shape of a patient's ear. The ear hook 74 may include a flexible tubular material that propagates sound from the right body 72 to the ear mold 76. Microphones 78, which gather sound and convert the gathered sound into an electrical signal, are located on the right body 72. An opening 80 within the ear mold 76 permits sound traveling through the ear hook 74 to exit into the patient's ear. An internal compartment 82 provides space for housing electronics, which will be discussed in further detail hereinbelow. Various controls 84 provide a patient interface with the hearing aid 10 on the right body 72 of the hearing aid 10. It should be appreciated that the various controls 64, 84 and other components of the left and right bodies 52, 72 may be at least partially integrated and consolidated. Further, it should be appreciated that the hearing aid 10 may have one or more microphones on each of the left and right bodies 52, 72 to improve directional hearing in certain implementations and provide, in some implementations, 360-degree directional sound input.

In one embodiment, the left and right bodies 52, 72 are connected at the respective ear hooks 54, 74 by a band member 90 which is configured to partially circumscribe a head or a neck of the patient. An internal compartment 92 within the band member 90 may provide space for electronics and the like. Additionally, the hearing aid 10 may include left and right earpiece covers 94, 96 respectively positioned exteriorly to the left and right bodies 52, 72. Each of the left and right earpiece covers 94, 96 isolate noise to block out interfering outside noises. To add further benefit, in one embodiment, the microphones 58 in the left body 52 and the microphones 78 in the right body 72 may cooperate to provide directional hearing.

Figure 4:
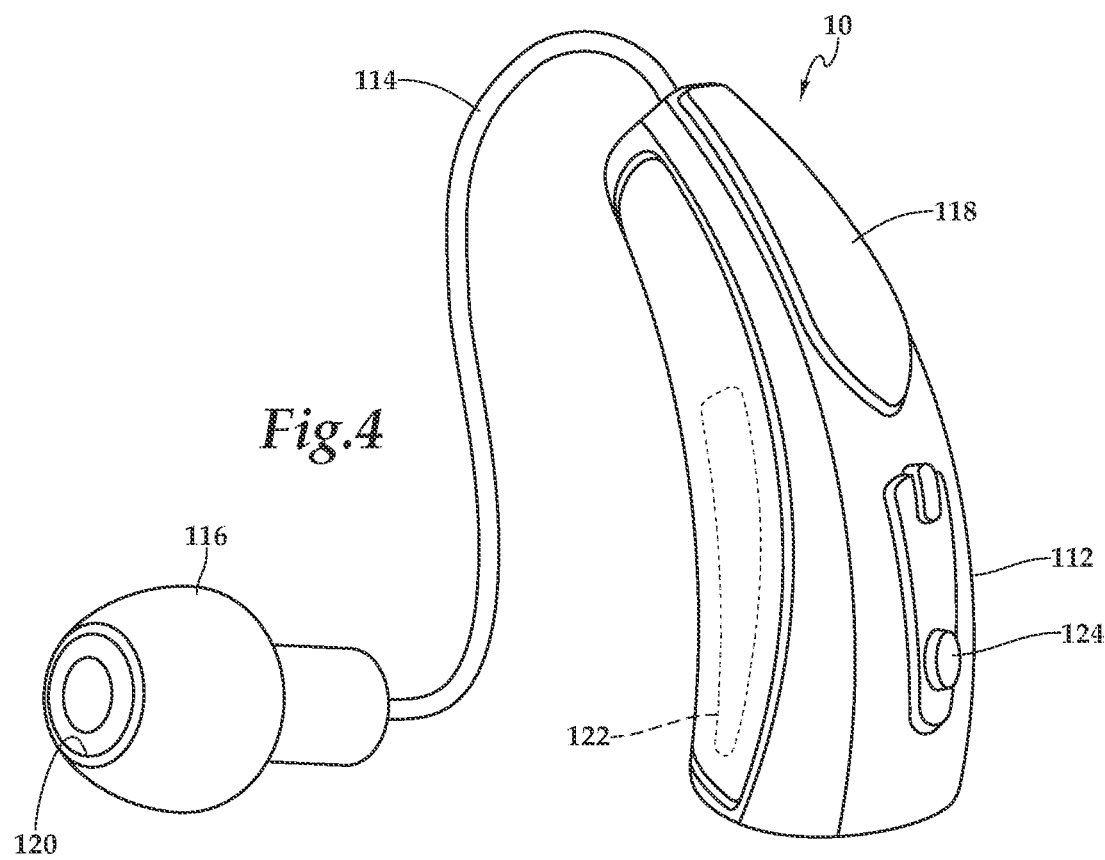
FIG. 4 is a front perspective view of another embodiment of a hearing aid programmed with one embodiment of a system for aiding hearing, according to the teachings presented herein.

Referring to FIG. 4, therein is depicted another embodiment of the hearing aid 10 that is programmed with the system for aiding hearing. It should be appreciated by a review of FIG. 2 through FIG. 4 that the system for aiding hearing presented herein may program any type of hearing aid. As shown, in the illustrated embodiment in FIG. 4, the hearing aid 10 includes a body 112 having an ear hook 114 extending from the body 112 to an ear mold 116. The body 112 and the ear mold 116 may each at least partially conform to the contours of the external ear and sized to engage therewith. By way of example, the body 112 may be sized to engage with the contours of the ear in a behind-the-ear-fit. The ear mold 116 may be sized to be fitted for the physical shape of a patient's ear. The ear hook 114 may include a flexible tubular material that propagates sound from the body 112 to the ear mold 116. A microphone 118, which gathers sound and converts the gathered sound into an electrical signal, is located on the body 112. An opening 120 within the ear mold 116 permits sound traveling through the ear hook 114 to exit into the patient's ear. An internal compartment 122 provides space for housing electronics, which will be discussed in further detail hereinbelow. Various controls 124 provide a patient interface with the hearing aid 10 on the body 112 of the hearing aid 10.

Figure 5:
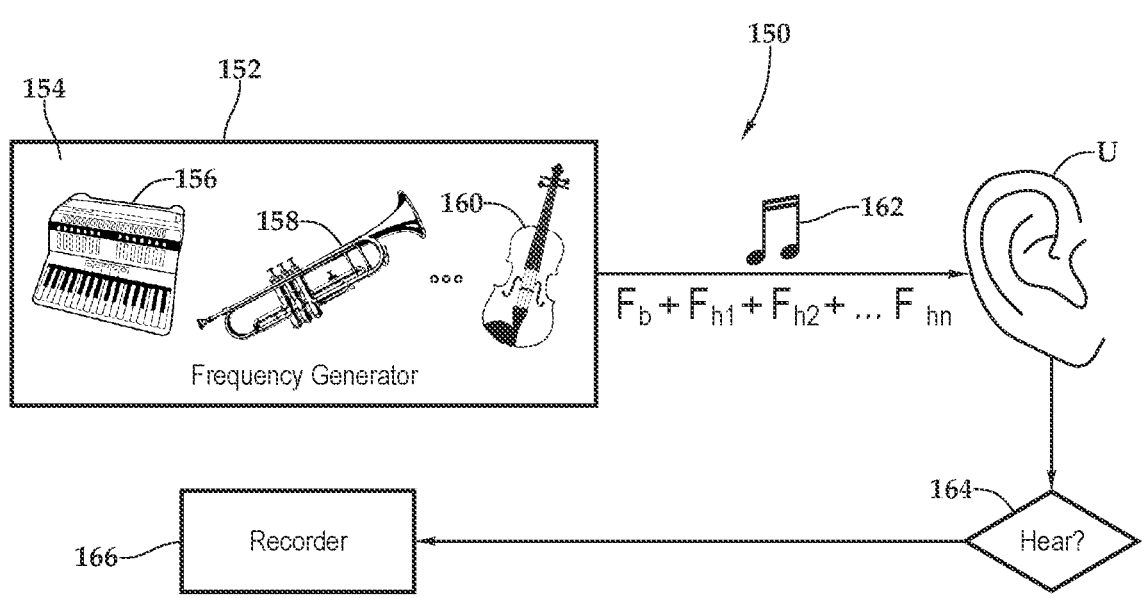
FIG. 5 is a schematic diagram depicting one embodiment the system for aiding hearing, according to the teachings presented herein.

Referring now to FIG. 5, one embodiment of a system 150 for aiding hearing is depicted that provides for calibrating and setting the hearing aid 10 for a preferred hearing range or preferred hearing ranges. A frequency generator 152 may be an electronic device that generates frequency signals with set properties of amplitude, frequency, and wave shape. The frequency generator 152 may screen an ear of a patient, i.e., the user U, with harmonic frequencies of a harmonic frequency series. In one embodiment, the harmonic frequencies may be musical sounds 154.

In a further embodiment, the musical sounds may be classical music instrument sounds, such as sounds from an instrument belonging to keyboard instruments, string instruments, woodwind instruments, or brass instruments, for example. The keyboard instruments may be a musical instrument played using a keyboard, a row of levers which are pressed by a finger or finger and may include a piano, organ, or harpsichord, for example. The string instruments may be chordophones or musical instruments that produce sound from vibrating strings when a performer plays or sounds the strings in some manner. The string instruments may include violins, violas, cellos, and basses, for example. The woodwind instruments may be a musical instrument that contains some type of resonator or tubular structure in which a column of air is set into vibration by the player blowing into or over a mouthpiece set at or near the end of the resonator. The woodwind instruments may include flutes, clarinets, oboes, bassoons, and saxophones, for example. The brass instruments may be a musical instrument that produces sound by sympathetic vibration of air in a tubular resonator in sympathy with the vibration of the player's lips. The brass instruments may include horns, trumpets, trombones, euphoniums, and tubas, for example.

As shown, the frequency generator 152 is programmed to produce sounds and, in one embodiment, live sounds which are non-discrete based on an organ 156, a trumpet 158, and a violin 160. As shown, non-discrete live sounds 162 are utilized to screen the ear of the user U. In one embodiment, the non-discrete live sounds 162 include a harmonic frequency series between 50 Hz and 10,000 Hz, with the harmonic frequency series being a fundamental frequency and integer multiples of the fundamental frequency. In another embodiment, the non-discrete live sounds 162 include a harmonic frequency series between 50 Hz and 5,000 Hz.

As will be illustrated with additional examples hereinbelow, the screening may be calibrated with multiple variables. Foremost, the test range of signals may be set. The selection of sound and music may be made. By way of further example, the harmonic frequencies screened may be decreasing frequencies or increasing frequencies. By way of further example, the harmonic frequencies may be a continuous sound or noncontinuous sound. The harmonic frequencies utilized for screening may include a single harmonic at a time or multiple harmonics at a time, which may or may not include the fundamental frequency. The amplification utilized in screening with the harmonic frequencies may be a constant amplification or an increasing amplification.

As shown, the non-discrete live sounds 162 may include harmonic frequencies as follows:

$$S=F_H=F_b+F_{h1}+F_{h2}+\ldots+F_{hn}; \text{ wherein}$$

S is the non-discrete live sound sounds;
$F_H$ is the harmonic frequencies;
$F_b$ is a base or fundamental frequency;
$F_{h1}$ is a is a first integer multiple of $F_b$;
$F_{h2}$ is a second integer multiple of $F_b$; and
$F_{hn}$ is an nth integer multiple of $F_b$.

It should be appreciated, however, that the non-discrete live sounds 162 may include other harmonic frequencies as, by way of example, follows:

$$S=F_H=F_b+F_{h1}; \text{ wherein}$$

S is the non-discrete live sound sounds;
$F_H$ is the harmonic frequencies;
$F_b$ is a base or fundamental frequency; and
$F_{h1}$ is a is a first integer multiple of $F_b$.

By way of further example, the non-discrete live sounds 162 may include elements of the harmonic frequency series as follows:

$$S=F_H=F_b+F_{h2}+F_{h4}+F_{2hn}; \text{ wherein}$$

S is the non-discrete live sound sounds;
$F_H$ is the harmonic frequencies;
$F_b$ is a base frequency;
$F_{h2}$ is a is a second integer multiple of $F_b$;
$F_{h4}$ is a is a fourth integer multiple of $F_b$; and
$F_{2hn}$ is a is a 2nth integer multiple of $F_b$.

It should be appreciated that the harmonic frequencies being utilized for testing, whether simultaneously, sequentially, or continuously, for example, may include any number of frequencies in the harmonic frequency series, which includes a fundamental frequency and multiple integer multiples, including consecutive and non-consecutive integer multiples, of the fundamental frequency. That is, the selection of the harmonic frequencies may vary depending on the testing circumstances. Upon screening, the user U indicates when the non-discrete live sounds are heard at a decision block 164 and the response or a lack of response is recorded at a recorder 166. Based on the data collected by the recorder 166, an algorithm may be created for the hearing aid 10 to assist with hearing.

The system 150 provides a non-discrete frequency test technology to establish a precise hearing frequency range or precise hearing frequency ranges in a patient's hearing by working with a base frequency $F_b$ and the harmonics ($F_{h1}+F_{h2}+\ldots+F_{hn}$), or a subset thereof, of the base frequency $F_b$. In this manner, the system 150 is designed to test, measure, and establish the patient's true hearing range. Instead of working with discrete frequencies, the system 150, in one implementation, employs music instrument tunes specific to corresponding frequencies or frequency ranges. The system 150, therefore, provides hearing impaired patients with a given frequency and the harmonics of the given frequency to identify the patient's hearing range.

By utilizing the base frequency $F_b$ and the harmonics ($F_{h1}+F_{h2}+\ldots+F_{hn}$), or a portion of the harmonics thereof, of the base frequency $F_b$, the testing methodology is similar to real life situations. When sounds are encountered in real life, single discrete frequencies are not often encountered. Life-sounds are complex and, in part, continuously changing mixture of base frequencies and harmonics. Therefore, rather than test a patient's hearing with discrete frequencies, the systems and methods presented herein utilize non-discrete harmonic frequencies to test a patient's hearing. Additionally, by utilizing non-discrete harmonic frequencies to test a patient's hearing to better replicate life sounds, testing time is decreased. By way of example, the third harmonic of 500 Hz is 1,500 Hz and the third harmonic of 2,000 Hz is 6,000 Hz, which is almost at the end point of a human testing range. Further, testing of human hearing over 5,0000 Hz is unnecessary in about 90% of the cases as reverse slope hearing loss is uncommon.

Figure 6:
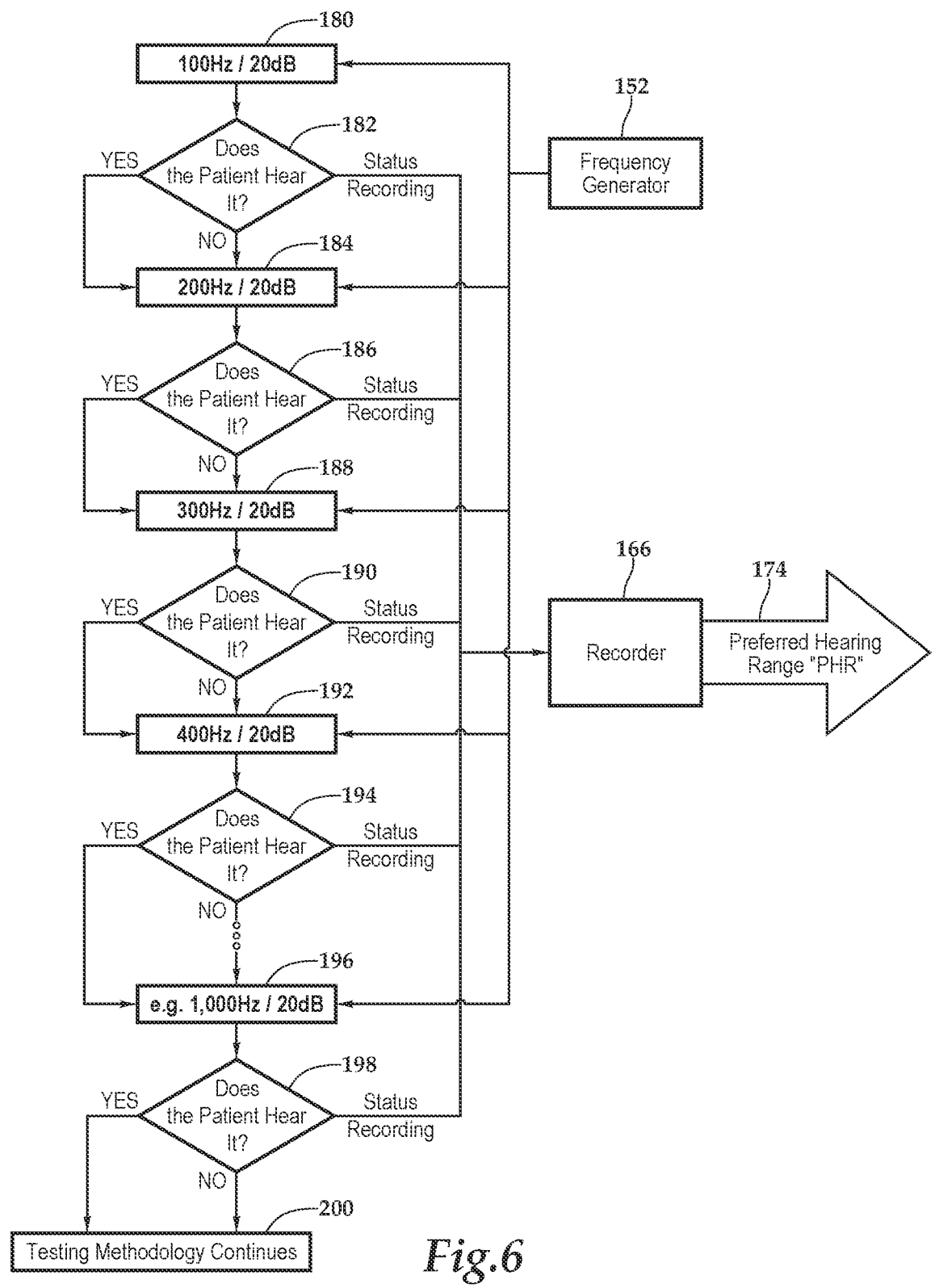
FIG. 6 is a flow chart depicting one embodiment of a method for calibrating and setting the hearing aid for a preferred hearing range or preferred hearing ranges, according to the teachings presented herein.

Referring now to FIG. 6, one embodiment of a method for calibrating and setting the hearing aid 10 for a preferred hearing range or preferred hearing ranges utilizing the methodology presented herein is shown. The method starts at block 180, when a patient is going to undergo testing to determine the preferred hearing range or preferred hearing ranges for use of the hearing aid 10. The frequency generator 152 and the recorder 166 interact with the methodology to provide the preferred hearing range 174 or a contribution thereto. As will be discussed in further detail hereinbelow, the frequency generator 152 and the recorder 166 may be embodied on any combination of smart devices, servers, and hearing aid test equipment. In the illustrated embodiment, a left ear or a right ear of a patient is tested with continuous sound being produced using increasing or decreasing frequencies between 100 Hz and 1,000 Hz, for example, for a sufficient time, such as 30 seconds. The patient may push a button when the sound is first heard.

At block 180, an initial frequency of 100 Hz at 20 dB is screened. As shown by decision block 182, the patient's ability to hear the initial frequency is recorded before the process continuously advances to the next frequency of a variable increment, which is 200 Hz at 20 dB, at block 184 and the patient's ability to hear is recorded at decision block 186. In this example, 100 Hz is the base frequency and 200 Hz, 300 Hz, 400 Hz, 500 Hz, 600 Hz, 700 Hz, 800 Hz, 900 Hz, and 1,000 Hz are exemplary integer multiples of the fundamental frequency with the base frequency and the integer multiples forming the harmonic frequency series.

At block 188 and decision block 190, the process advances continuously for the next incremental frequency in the harmonic frequency series, e.g., 300 Hz at 20 dB. Similarly, at block 192 and decision block 194, the methodology continuously advances through 400 Hz at 20 dB. The process may continuously advance through the harmonic frequency series to block 196 and decision block 198 for 1,000 Hz at 20 dB. As indicated in block 200, the testing methodology continues for the frequencies under test with the results being recorded.

Figure 7:
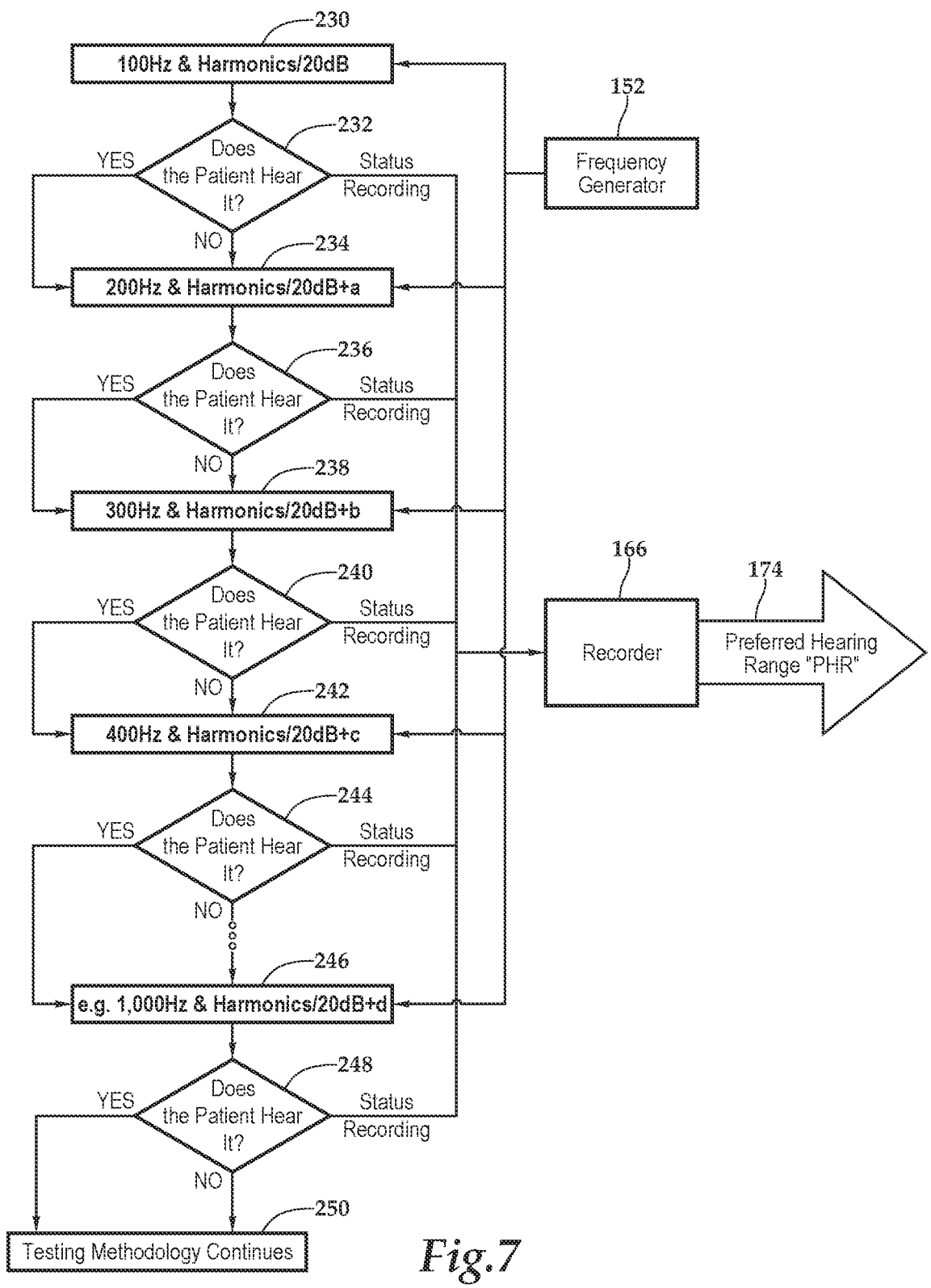
FIG. 7 is a flow chart depicting another embodiment of a method for calibrating and setting the hearing aid for a preferred hearing range or preferred hearing ranges, according to the teachings presented herein.

Referring now to FIG. 7, another embodiment of a method for calibrating and setting the hearing aid 10 for a preferred hearing range or preferred hearing ranges utilizing the methodology presented herein is shown. In this exemplary methodology, amplification is increased in a step-by-step manner as a patient is tested in 100 Hz increments of a harmonic frequency series. By way of example, the following equations exemplify this methodology:

$F_b$=100 Hz such that $F_T=F_b 100+F_{h1}+F_{h2}+\ldots+F_{hn}$ at 20 db;

$F_b$=200 Hz such that $F_T=F_b 200+F_{h1}+F_{h2}+\ldots+F_{hb}$ at 20 db+$a$; and $F_{bN}$=Z Hz such that $F_T=F_{bZ}+F_{h1}+F_{h2}+\ldots+F_{hn}$ at 20 db+$y$; wherein $F_b$ is the fundamental frequency;
$F_T$ is the testing frequency;
$F_h$ is an integer multiple of the fundamental frequency;
ZHz is the highest frequency in the chosen range;
a is an increased amplification; and
y is an increased amplification.

Continuing to refer to FIG. 7, the method starts at block 230, when a patient is going to undergo testing to determine the preferred hearing range or preferred hearing ranges for use of the hearing aid 10. The frequency generator 152 and the recorder 166 interact with the methodology to provide the preferred hearing range 174 or a contribution thereto. As will be discussed in further detail hereinbelow, the frequency generator 152 and the recorder 166 may be embodied on any combination of smart devices, servers, and hearing aid test equipment. In the illustrated embodiment, a left ear or a right ear of a patient is tested with continuous sound being produced using increasing or decreasing frequencies between 100 Hz and 1,000 Hz, for example, for a sufficient time, such as 30 seconds. The patient may push a button when the sound is first heard.

At block 230, an initial frequency of 100 Hz with at least one harmonic frequency of a harmonic series at 20 dB is screened. As shown by decision block 232, the patient's ability to hear the initial frequency is recorded before the process advances to the next frequency of a variable increment, which is 200 Hz with at least one harmonic frequency of a harmonic series at 20 dB with an increased amplification applied thereto as reflected by 20 db+$a$, at block 234 and the patient's ability to hear is recorded at decision block 236.

At block 238 and decision block 240, the process advances continuously for the next incremental frequency in the harmonic frequency series, e.g., 300 Hz with at least one harmonic frequency of a harmonic series at 20 dB with an increased amplification applied thereto as reflected by 20 db+$b$. Similarly, at block 242 and decision block 244, the methodology advances through 400 Hz with at least one harmonic frequency of a harmonic series at 20 dB with an increased amplification applied thereto as reflected by 20 db+$c$. The process may advance through the harmonic frequency series to block 246 and decision block 248 for 1,000 Hz with at least one harmonic frequency of a harmonic series at 20 dB with an increased amplification applied thereto as reflected by 20 db+$d$. As indicated in block 250, the testing methodology continues for the frequencies under test with the results being recorded.

Figure 8:
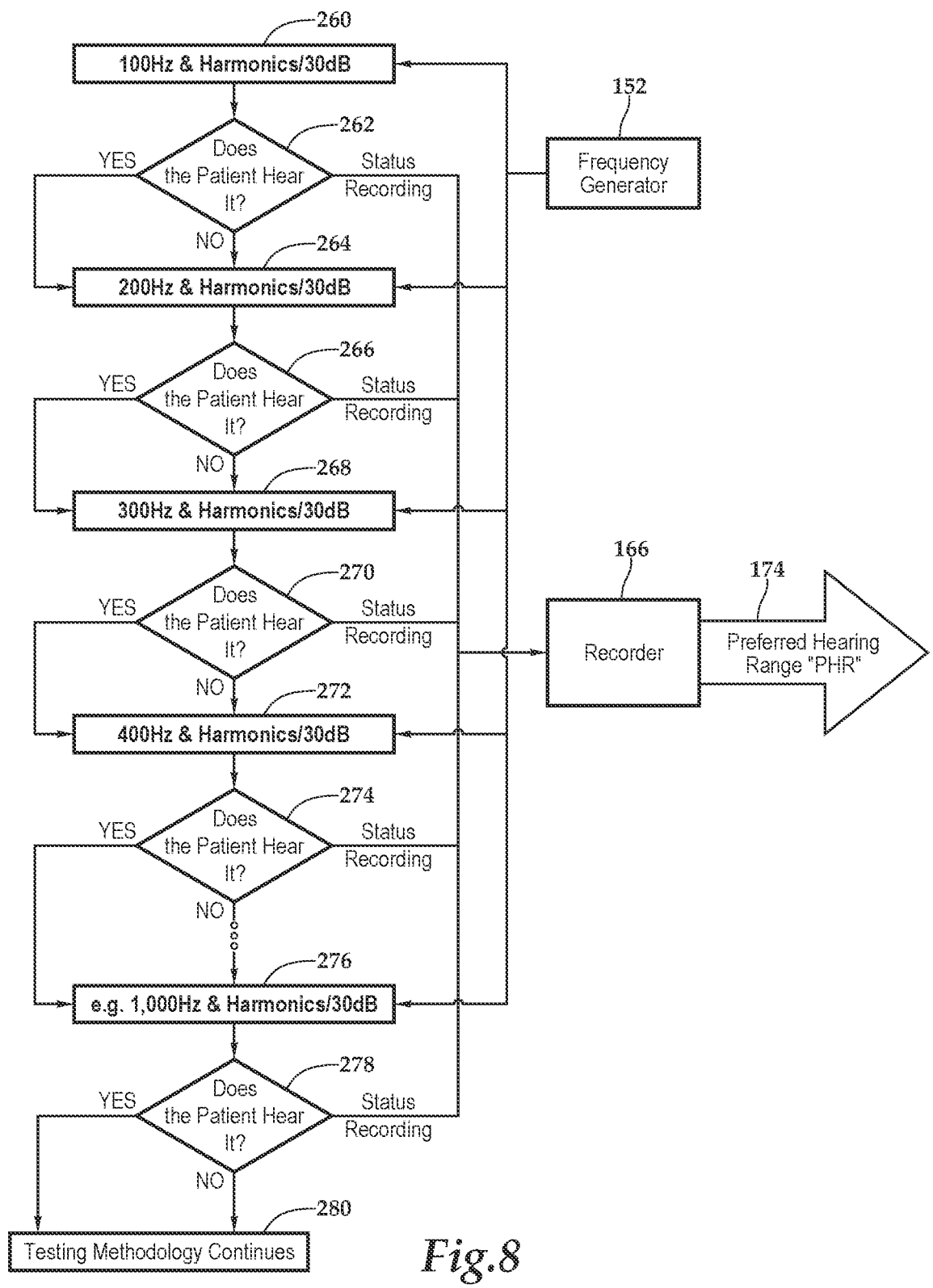
FIG. 8 is a flow chart depicting still another embodiment of a method for calibrating and setting the hearing aid for a preferred hearing range or preferred hearing ranges, according to the teachings presented herein.

Referring now to FIG. 8, a still further embodiment of a method for calibrating and setting the hearing aid 10 for a preferred hearing range or preferred hearing ranges utilizing the methodology presented herein is shown. In this exemplary methodology, constant amplification is utilized in a step-by-step manner as a patient is tested in 100 Hz increments of a harmonic frequency series. By way of example, the following equations exemplify this methodology:

$F_b$=100 Hz such that $F_T=F_b 100+F_{h1}+F_{h2}+\ldots+F_{hn}$ at 30 db;

$F_b$=200 Hz such that $F_T=F_b 200+F_{h1}+F_{h2}+\ldots+F_{hn}$ at 30 db; and $F_{bN}$=Z Hz such that $F_T=F_{bZ}+F_{h1}+F_{h2}+\ldots+F_{hn}$ at 30 db; wherein $F_b$ is the fundamental or base frequency;
$F_T$ is the testing frequency;
$F_h$ is an integer multiple of the fundamental frequency; and
ZHz is the highest frequency, Z, in the chosen range.

Continuing to refer to FIG. 8, The method starts at block 260, when a patient is going to undergo testing to determine the preferred hearing range or preferred hearing ranges for use of the hearing aid 10. As with the methodologies in FIGS. 6-7, the frequency generator 152 and the recorder 166 interact with the methodology to provide the preferred hearing range 174 or a contribution thereto. In the illustrated embodiment, a left ear or a right ear of a patient is tested with continuous sound being produced using increasing or decreasing frequencies between 100 Hz and 1,000 Hz, for example, for a sufficient time, such as 30 seconds. The patient may push a button when the sound is first heard.

At block 260, an initial frequency of 100 Hz with at least one harmonic frequency of a harmonic series at 30 dB is screened. As shown by decision block 262, the patient's ability to hear the initial frequency is recorded before the process advances to the next incremental frequency, which is 200 Hz with at least one harmonic frequency of a harmonic series at 30 dB, at block 264 and the patient's ability to hear is recorded at decision block 266.

At block 268 and decision block 270, the process advances to the next incremental frequency in the testing of the applicable harmonic frequency series, e.g., 300 Hz with at least one harmonic frequency of a harmonic series at 30 dB. Similarly, at block 272 and decision block 274, the methodology advances through 400 Hz with at least one harmonic frequency of a harmonic series at 30 dB. The process may advance through the harmonic frequency series to block 276 and decision block 278 for 1,000 Hz with at least one harmonic frequency of a harmonic series at 30 dB. As indicated in block 280, the testing methodology continues for the frequencies under test with the results being recorded.

Figure 9:
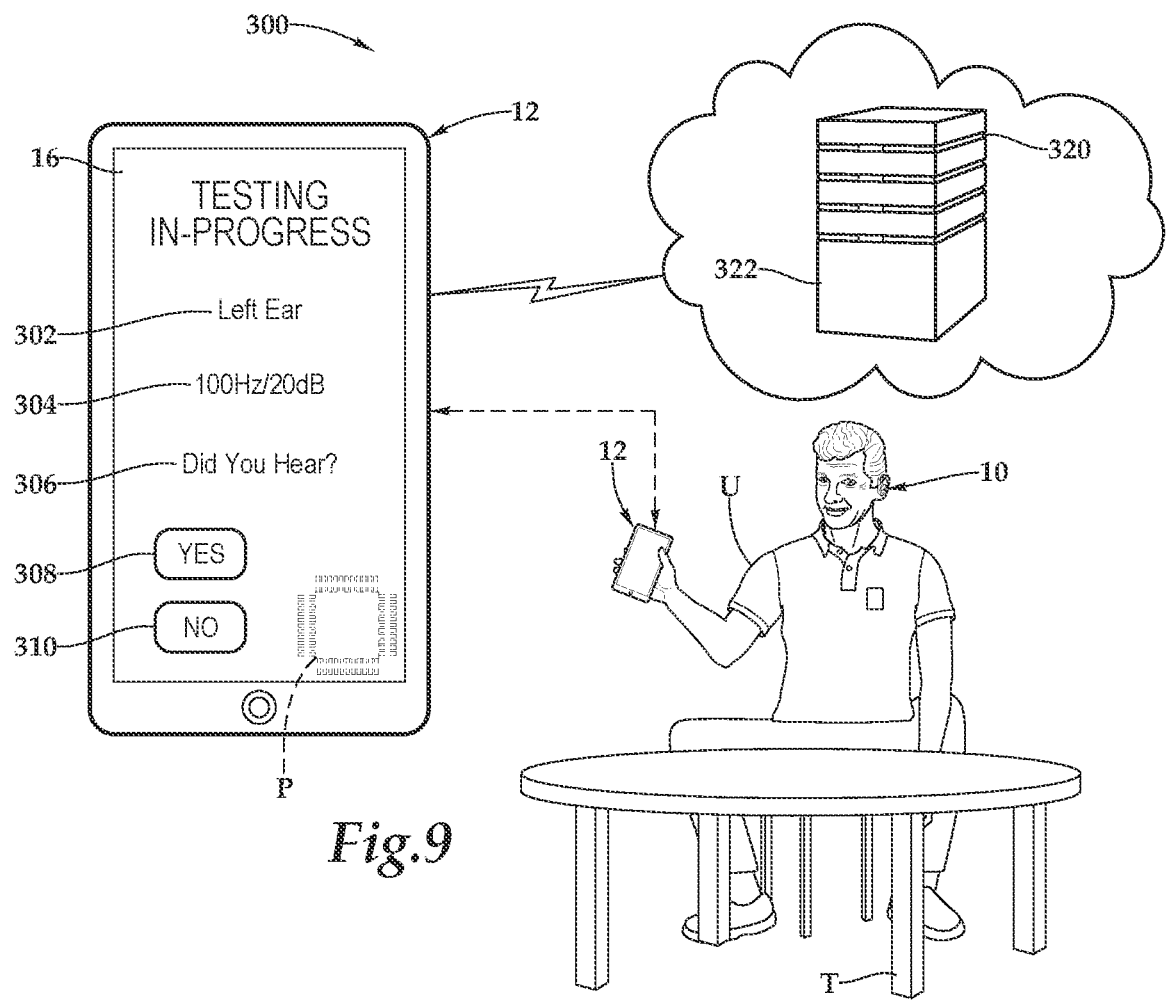
FIG. 9 is a front perspective schematic diagram depicting one embodiment of a hearing aid being programmed with one embodiment of a system for aiding hearing, according to the teachings presented herein.

Referring now to FIG. 9, one embodiment of a system 300 for aiding hearing is shown. As shown, the user U, who may be considered a patient requiring a hearing aid, is wearing the hearing aid 10 and sitting at a table T. The hearing aid 10 has a pairing with the proximate smart device 12 such the hearing aid 10 and the proximate smart device 12 may determine the user's preferred hearing range for each ear and subsequently program the hearing aid 10 with the preferred hearing ranges. The proximate smart device 12, which may be a smart phone, a smart watch, or a tablet computer, for example, is executing a hearing screening program. The display 14 serves as an interface for the user U. As shown, various indicators, such as indicators 302, 304, 306 show that the testing of the left ear is in progress at 100 Hz at 20 dB. The user U is asked if the sound was heard at the indicator 306 and the user U may appropriately respond at soft button 308 or soft button 310. In this way, the system 300 screens, via a speaker and the user interface 16 associated with the proximate smart device 12, a left ear—and separately, a right ear—of the user U at multiple harmonic frequencies of a harmonic frequency series between 50 Hz and 10,000 Hz, with detected frequencies, optionally, being re-ranged tested to better identify the frequencies and decibel levels heard. Following the completion of the screening, the system 300 then determines a left ear preferred hearing range and a right ear preferred hearing range. As previously discussed, the harmonic frequency series may be a fundamental frequency and multiple integer multiples of the fundamental frequency.

As shown the proximate smart device 12 may be in communication with a server 320 having a housing 322. The smart device may utilize distributed processing between the proximate smart device 12 and the server 320 to at least one of screen the left ear, screen the right ear, determine the left ear preferred hearing range, and determine the right ear preferred hearing range. As previously mentioned, the processing to screen the left ear, screen the right ear, determine the left ear preferred hearing range, and determine the right ear preferred hearing range may be located on a smart device, a server, hearing testing equipment, or any combination thereof.

Figure 10:
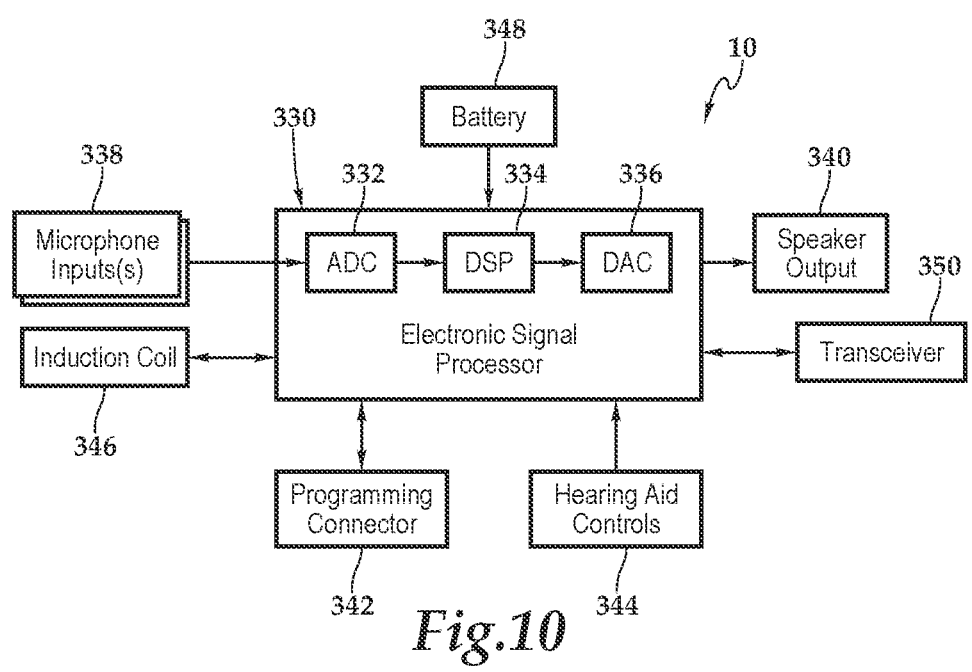
FIG. 10 is a functional block diagram depicting one embodiment of the hearing aid depicted in FIG. 9.

Referring now to FIG. 10, an illustrative embodiment of the internal components of the hearing aid 10 is depicted. By way of illustration and not by way of limitation, the hearing aid 10 depicted in the embodiment of FIG. 2 and FIGS. 3A, 3B is presented. It should be appreciated, however, that the teachings of FIG. 5 equally apply to the embodiment of FIG. 4. As shown, with respect to FIGS. 3A and 3B, in one embodiment, within the internal compartments 62, 82, an electronic signal processor 330 may be housed. The hearing aid 10 may include the electronic signal processor 330 for each ear or the electronic signal processor 330 for each ear may be at least partially integrated or fully integrated. In another embodiment, with respect to FIG. 4, within the internal compartment 122 of the body 112, the electronic signal processor 330 is housed. In order to measure, filter, compress, and generate, for example, continuous real-world analog signals in form of sounds, the electronic signal processor 330 may include an analog-to-digital converter (ADC) 332, a digital signal processor (DSP) 334, and a digital-to-analog converter (DAC) 336. The electronic signal processor 330, including the digital signal processor embodiment, may have memory accessible to a processor. One or more microphone inputs 338 corresponding to one or more respective microphones, a speaker output 340, various controls, such as a programming connector 342 and hearing aid controls 344, an induction coil 346, a battery 348, and a transceiver 350 are also housed within the hearing aid 10.

As shown, a signaling architecture communicatively interconnects the microphone inputs 338 to the electronic signal processor 330 and the electronic signal processor 330 to the speaker output 340. The various hearing aid controls 344, the induction coil 346, the battery 348, and the transceiver 350 are also communicatively interconnected to the electronic signal processor 330 by the signaling architecture. The speaker output 340 sends the sound output to a speaker or speakers to project sound and in particular, acoustic signals in the audio frequency band as processed by the hearing aid 10. By way of example, the programming connector 342 may provide an interface to a computer or other device and, in particular, the programming connector 342 may be utilized to program and calibrate the hearing aid 10 with the system 300, according to the teachings presented herein. The hearing aid controls 344 may include an ON/OFF switch as well as volume controls, for example. The induction coil 346 may receive magnetic field signals in the audio frequency band from a telephone receiver or a transmitting induction loop, for example, to provide a telecoil functionality. The induction coil 346 may also be utilized to receive remote control signals encoded on a transmitted or radiated electromagnetic carrier, with a frequency above the audio band. Various programming signals from a transmitter may also be received via the induction coil 346 or via the transceiver 350, as will be discussed. The battery 348 provides power to the hearing aid 10 and may be rechargeable or accessed through a battery compartment door (not shown), for example. The transceiver 350 may be internal, external, or a combination thereof to the housing. Further, the transceiver 350 may be a transmitter/receiver, receiver, or an antenna, for example. Communication between various smart devices and the hearing aid 10 may be enabled by a variety of wireless methodologies employed by the transceiver 150, including 802.11, 3G, 4G, Edge, WiFi, ZigBee, near field communications (NFC), Bluetooth low energy, and Bluetooth, for example.

The various controls and inputs and outputs presented above are exemplary and it should be appreciated that other types of controls may be incorporated in the hearing aid 10. Moreover, the electronics and form of the hearing aid 10 may vary. The hearing aid 10 and associated electronics may include any type of headphone configuration, a behind-the-ear configuration, an over-the-ear configuration, or in-the-ear configuration, for example. Further, as alluded, electronic configurations with multiple microphones for directional hearing are within the teachings presented herein. In some embodiments, the hearing aid has an over-the-ear configuration where the entire ear is covered, which not only provides the hearing aid functionality but hearing protection functionality as well.

Continuing to refer to FIG. 10, in one embodiment, the electronic signal processor 330 may be programmed with a preferred hearing range which, in one embodiment, is the preferred hearing sound range corresponding to highest hearing capacity of a patient. In one embodiment, the left ear preferred hearing range and the right ear preferred hearing range are each a range of sound corresponding to highest hearing capacity of an ear of a patient between 50 Hz and 10,000 Hz, as tested with the utilization of one or more harmonic frequency series. With this approach, the hearing capacity of the patient is enhanced. Existing audiogram hearing aid industry testing equipment measures hearing capacity at defined, discrete frequencies, such as 60 Hz; 125 Hz; 250 Hz; 500 Hz; 1,000 Hz; 2,000 Hz; 4,000 Hz; 8,000 Hz and existing hearing aids work on a ratio-based frequency scheme. The present teachings, however, measure hearing capacity with harmonics to improve the speed of the testing and to provide an algorithm for hearing similar to real-life with multiple non-discrete harmonics utilized.

Further, in one embodiment, the preferred hearing sound range may be shifted by use of various controls the 124.

Directional microphone systems on each microphone position and processing may be included that provide a boost to sounds coming from the front of the patient and reduce sounds from other directions. Such a directional microphone system and processing may improve speech understanding in situations with excessive background noise. Digital noise reduction, impulse noise reduction, and wind noise reduction may also be incorporated. As alluded to, system compatibility features, such as FM compatibility and Bluetooth compatibility, may be included in the hearing aid 10.

The ADC 332 outputs a digital total sound ($S_T$) signal that undergoes the frequency spectrum analysis. In this process, the base frequency ($F_B$) and harmonics ($H_1, H_2, \ldots, H_N$) components are separated. Using the algorithms presented hereinabove and having a converted based frequency ($CF_B$) set as a target frequency range, the harmonics processing within the electronic signal processor 330 calculates a converted actual frequency ($CF_A$) and a differential converted harmonics (DCHN) to create a converted total sound ($CS_T$), which is the output of the harmonics processing by the electronic signal processor 330.

More particularly, total sound ($S_T$) may be defined as follows:

$$S_T = F_B + H_1 + H_2 + \ldots + H_N, \text{ wherein}$$

$S_T$=total sound;

$F_B$=base frequency range, with $F_B$=range between FBl, and $F_{BH}$ with $F_{BL}$ being the lowest frequency value in base frequency and $F_{BH}$ being the highest frequency Value in Base Frequency;

$H_N$=harmonics of $F_B$ with $H_N$ being a mathematical multiplication of $F_B$;

$F_A$=an actual frequency value being examined;

$H_{A1}$=$1^{st}$ harmonic of $F_A$;

$H_{A2}$=$2^{nd}$ harmonic of $F_A$; and $H_{AN}$=$N^{th}$ harmonic of $F_A$ with $H_{AN}$ being the mathematical multiplication of $F_A$.

In many hearing impediment cases, the total sound ($S_T$) may be at any frequency range; furthermore, the two ears true hearing range may be entirely different. Therefore, the hearing aid 10 presented herein may transfer the base frequency range ($F_B$) along with several of the harmonics ($H_N$) into the actual hearing range (AHR) by converting the base frequency range ($F_B$) and several chosen harmonics ($H_N$) into the actual hearing range (AHR) as one coherent converted total sound ($CS_T$) by using the following algorithm defined by following equations:

$$\frac{F_A \times CF_{BL}}{F_{BL}} = CF_A \quad \text{Equation (1)}$$

$$\frac{CF_A}{F_A} = M \quad \text{Equation (2)}$$

$$CH_{AN} = M \times H_N \quad \text{Equation (3)}$$

wherein for Equation (1), Equation (2), and Equation (3):

M=multiplier between $CF_A$ and $F_A$;

$CS_T$=converted total sound;

$CF_B$=converted base frequency;

$CH_{A1}$=$1^{st}$ converted harmonic;

$CH_{A2}$=$2^{nd}$ converted harmonic;

$CH_{AN}$=$N^{th}$ converted harmonic;

$CF_{BL}$=lowest frequency value in $CF_B$;

$CF_{BH}$=Highest frequency value in $CF_B$; and $CF_A$=Converted actual frequency.

By way of example and not by way of limitation, an application of the algorithm utilizing Equation (1), Equation (2), and Equation (3) is presented. For this example, the following assumptions are utilized:

$F_{BL}$=170 Hz $F_{BH}$=330 Hz $CF_{BL}$=600 Hz $CF_{BH}$=880 Hz $F_A$=180 Hz

Therefore, for this example, the following will hold true:

$H_1$=360 Hz $H_4$=720 Hz $H_8$=1,440 Hz $H_{16}$=2,880 Hz $H_{32}$=5,760 Hz

Using the algorithm, the following values may be calculated:

$CF_A$=635 Hz $CH_A1$=1,267 Hz $CH_{A4}$=2,534 Hz $CH_{A8}$=5,068 Hz $CH_{A16}$=10,137 Hz $CH_{A32}$=20,275 Hz

To calculate the differentials (D) between the harmonics $H_N$ and the converted harmonics ($CH_{AN}$), the following equation is employed:

$$CH_{AN} - H_N = D \text{ equation.}$$

This will result in differential converted harmonics (DCH) as follows:

$DCH_1$=907 Hz $DCH_4$=1,814 Hz $DCH_8$=3, 628 Hz $DCH_{16}$=7,257 Hz $DCH_{32}$=14,515 Hz

In some embodiments, a high-pass filter may cut all differential converted harmonics (DCH) above a predetermined frequency. The frequency of 5,000 Hz may be used as a benchmark. In this case the frequencies participating in converted total sound ($CS_T$) are as follows:

$CF_A$=635 Hz $DCH_1$=907 Hz $DCH_4$=1,814 Hz $DCH_8$=3, 628 Hz

The harmonics processing at the DSP 334 may provide the conversion for each participating frequency in total sound ($S_T$) and distributing all participating converted actual frequencies ($CF_A$) and differential converted harmonics (DCHN) in the converted total sound ($CS_T$) in the same ratio as participated in the original total sound ($S_T$). In some implementations, should more than seventy-five percent (75%) of all the differential converted harmonics (DCHN) be out of the high-pass filter range, the harmonics processing may use an adequate multiplier (between 0.1-0.9) and add the created new differential converted harmonics (DCHN) to converted total sound ($CS_T$).

The processor may process instructions for execution within the electronic signal processor 330 as a computing device, including instructions stored in the memory. The memory stores information within the computing device. In one implementation, the memory is a volatile memory unit or units. In another implementation, the memory is a non-volatile memory unit or units. The memory is accessible to the processor and includes processor-executable instructions that, when executed, cause the processor to execute a series of operations. The processor-executable instructions cause the processor to receive an input analog signal from the microphone inputs 338 and convert the input analog signal to a digital signal. The processor-executable instructions then cause the processor to transform through compression, for example, the digital signal into a processed digital signal having the preferred hearing range. The transformation may be a frequency transformation where the input frequency is frequency transformed into the preferred hearing range. Such a transformation is a toned-down, narrower articulation that is clearly understandable as it is customized for the user. The processor is then caused by the processor-executable instructions to convert the processed digital signal to an output analog signal and drive the output analog signal to the speaker output 340.

Figure 11:
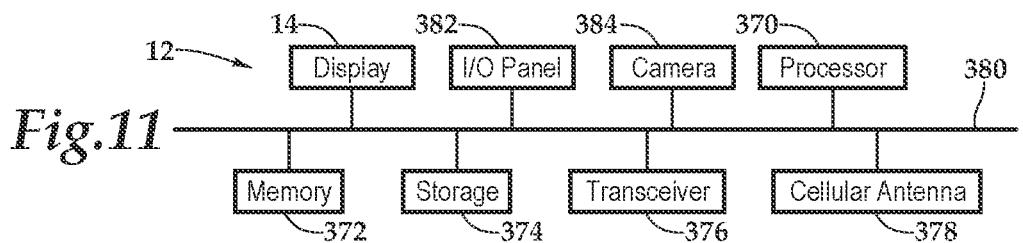
FIG. 11 is a functional block diagram of a smart device, which forms a portion of the system for aiding hearing depicted in FIG. 9.

Referring now to FIG. 11, the proximate smart device 12 may be a wireless communication device of the type including various fixed, mobile, and/or portable devices. To expand rather than limit the discussion of the proximate smart device 12, such devices may include, but are not limited to, cellular or mobile smart phones, tablet computers, smartwatches, and so forth. The proximate smart device 12 may include a processor 370, memory 372, storage 374, a transceiver 376, and a cellular antenna 378 interconnected by a busing architecture 380 that also supports the display 14, I/O panel 382, and a camera 384. It should be appreciated that although a particular architecture is explained, other designs and layouts are within the teachings presented herein.

The proximate smart device 12 includes the memory 372 accessible to the processor 370 and the memory 372 includes processor-executable instructions that, when executed, cause the processor 370 to screen, via the speaker and the user interface, a left ear of a patient at harmonic frequencies of a harmonic frequency series, with detected frequencies being optionally re-ranged tested at a more discrete increment, such as a 5 Hz to 20 Hz increment. The harmonic frequency series may be between 50 Hz and 10,000 Hz or 50 Hz and 5,000 Hz, for example. The processor-executable instructions may also determine a left ear preferred hearing range, which is a range of sound corresponding to highest hearing capacity based on the utilization of harmonic frequency series of the left ear of the patient.

The processor-executable instructions then cause the processor 370 to screen, via the speaker and the user interface, a right ear of a patient at harmonic frequencies of a harmonic frequency series, with detected frequencies being optionally re-ranged tested at a more discrete increment, such as a 5 Hz to 20 Hz increment. The harmonic frequency series may be between 50 Hz and 10,000 Hz or 50 Hz and 5,000 Hz, for example. The processor-executable instructions may also determine a right ear preferred hearing range, which is a range of sound corresponding to highest hearing capacity based on the utilization of harmonic frequency series of the right ear of the patient. Also, the processor executable instructions may cause the processor 370 to, when executed, utilize distributed processing between the proximate smart device 12 and a server to at least one of screen the left ear, screen the right ear, determine the left ear preferred hearing range, and determine the right ear preferred hearing range.

The processor-executable instructions presented hereinabove include, for example, instructions and data which cause a general purpose computer, special purpose computer, or special purpose processing device to perform a certain function or group of functions. Processor-executable instructions also include program modules that are executed by computers in stand-alone or network environments. Generally, program modules include routines, programs, components, data structures, objects, and the functions inherent in the design of special-purpose processors, or the like, that perform particular tasks or implement particular abstract data types. Processor-executable instructions, associated data structures, and program modules represent examples of the program code means for executing steps of the systems and methods disclosed herein. The particular sequence of such executable instructions or associated data structures represents examples of corresponding acts for implementing the functions described in such steps and variations in the combinations of processor-executable instructions and sequencing are within the teachings presented herein.

After the hearing aid 10 is programmed, in operation, the teachings presented herein permit the proximate smart device 12 such as a smart phone to form a pairing with the hearing aid 10 and operate the hearing aid 10. As shown, the proximate smart device 12 includes the memory 372 accessible to the processor 370 and the memory 372 includes processor-executable instructions that, when executed, cause the processor 370 to provide an interface for an operator that includes an interactive application for viewing the status of the hearing aid 10. The processor 370 is caused to present a menu for controlling the hearing aid 10. The processor 370 is then caused to receive an interactive instruction from the user and forward a control signal via the transceiver 376, for example, to implement the instruction at the hearing aid 10. The processor 370 may also be caused to generate various reports about the operation of the hearing aid 10. The processor 370 may also be caused to translate or access a translation service for the audio.

Figure 12:
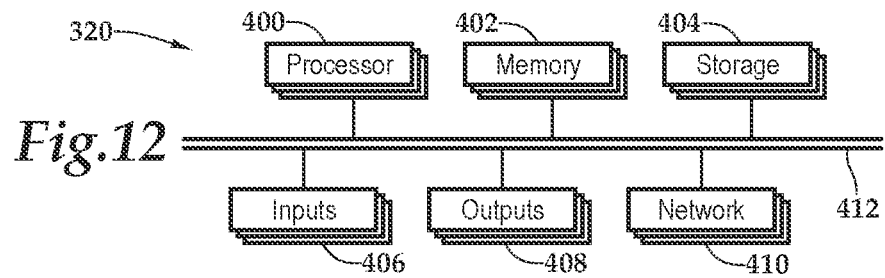
FIG. 12 is a functional block diagram depicting one embodiment of a server, which forms a portion of the system for aiding hearing depicted in FIG. 9.

Referring now to FIG. 12, one embodiment of the server 320 as a computing device includes, within the housing 322, a processor 400, memory 402, and storage 404 interconnected with various buses 412 in a common or distributed, for example, mounting architecture that also supports inputs 406, outputs 408, and network interface 410. In other implementations, in the computing device, multiple processors and/or multiple buses may be used, as appropriate, along with multiple memories and types of memory. Further still, in other implementations, multiple computing devices may be provided and operations distributed therebetween. The processor 400 may process instructions for execution within the server 320, including instructions stored in the memory 402 or in storage 404. The memory 402 stores information within the computing device. In one implementation, the memory 402 is a volatile memory unit or units. In another implementation, the memory 402 is a non-volatile memory unit or units. Storage 404 includes capacity that is capable of providing mass storage for the server 320, including crane service database storage capacity. Various inputs 406 and outputs 408 provide connections to and from the server 320, wherein the inputs 406 are the signals or data received by the server 320, and the outputs 408 are the signals or data sent from the server 320. The network interface 410 provides the necessary device controller to connect the server 320 to one or more networks.

The memory 402 is accessible to the processor 400 and includes processor-executable instructions that, when executed, cause the processor 400 to execute a series of operations. The processor 400 may be caused to screen, via the speaker and the user interface, a left ear of a patient at harmonic frequencies of a harmonic frequency series, with detected frequencies being optionally re-ranged tested at a more discrete increment, such as a 5 Hz to 20 Hz increment. The harmonic frequency series may be between 50 Hz and 10,000 Hz or 50 Hz and 5,000 Hz, for example. The processor-executable instructions may also determine a left ear preferred hearing range, which is a range of sound corresponding to highest hearing capacity based on the utilization of harmonic frequency series of the left ear of the patient.

The processor-executable instructions may also determine a right ear preferred hearing range, which is a range of sound corresponding to highest hearing capacity of the right ear of the patient between 50 Hz and 10,000 Hz based on the utilization of harmonic frequencies of a harmonic frequency series. The processor-executable instructions then cause the processor 400 to screen, via the speaker and the user interface, a right ear of a patient at harmonic frequencies of a harmonic frequency series, with detected frequencies being optionally re-ranged tested at a more discrete increment, such as a 5 Hz to 20 Hz increment. The harmonic frequency series may be between 50 Hz and 10,000 Hz or 50 Hz and 5,000 Hz, for example. The processor-executable instructions may also determine a left ear preferred hearing range, which is a range of sound corresponding to highest hearing capacity based on the utilization of harmonic frequency series of the left ear of the patient. Also, the processor executable instructions may cause the processor 400 to, when executed, utilize distributed processing between the server 320 and the proximate smart device 12 or hearing testing equipment to at least one of screen the left ear, screen the right ear, determine the left ear preferred hearing range, and determine the right ear preferred hearing range.

The processor-executable instructions presented hereinabove include, for example, instructions and data which cause a general purpose computer, special purpose computer, or special purpose processing device to perform a certain function or group of functions. Processor-executable instructions also include program modules that are executed by computers in stand-alone or network environments. Generally, program modules include routines, programs, components, data structures, objects, and the functions inherent in the design of special-purpose processors, or the like, that perform particular tasks or implement particular abstract data types. Processor-executable instructions, associated data structures, and program modules represent examples of the program code means for executing steps of the systems and methods disclosed herein. The particular sequence of such executable instructions or associated data structures represents examples of corresponding acts for implementing the functions described in such steps and variations in the combinations of processor-executable instructions and sequencing are within the teachings presented herein.

Figure 13:
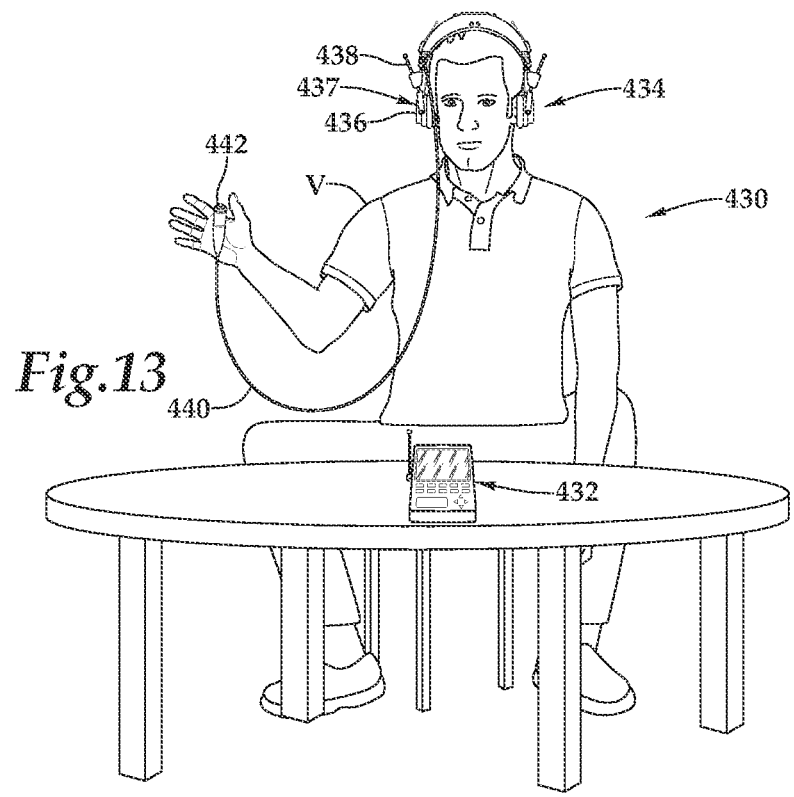
FIG. 13 is a front perspective schematic diagram depicting another embodiment of a system for aiding hearing, according to the teachings presented herein.

Referring now FIG. 13, another embodiment of a system 430 for aiding hearing is shown. As shown, a user V, who may be considered a patient requiring a hearing aid, is utilizing a hearing testing device 434 with a testing/programming unit 432 and a headset 436 having headphones 437 with a transceiver 438 for communicating with the hearing testing device 434. A push button 442 is coupled with cabling 440 to the headset 436 to provide an interface for the user V to indicate when a particular sound, i.e., frequency and decibel is heard. In this way, the system 430 screens, via a speaker in the headset 436 and a user interface with the push button 442, a left ear—and separately, a right ear—of the user V at selected frequencies based on the harmonic frequencies of a harmonic frequency series discussed above, between a frequency range of 50 Hz to 10,000 Hz, with detected frequencies being re-ranged tested to better identify the frequencies and decibel levels heard.

Figure 14:
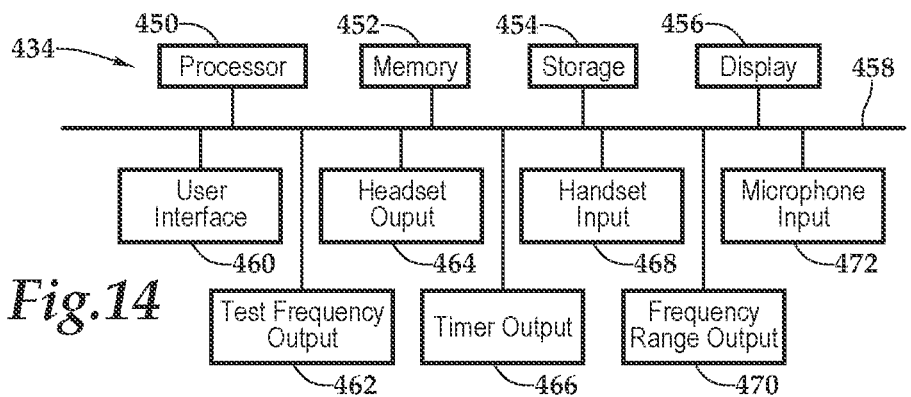
FIG. 14 is a functional block diagram depicting one embodiment of hearing aid test equipment depicted in FIG. 13.

Referring now to FIG. 14, the hearing testing device 434 depicted as a computing device is shown. Within a housing (not shown), a processor 450, memory 452, storage 454, and a display 456 are interconnected by a busing architecture 458 within a mounting architecture. The processor 450 may process instructions for execution within the computing device, including instructions stored in the memory 452 or in storage 454. The memory 452 stores information within the computing device. In one implementation, the memory 452 is a volatile memory unit or units. In another implementation, the memory 452 is a non-volatile memory unit or units. The storage 454 provides capacity that is capable of providing mass storage for the hearing testing device 434. Various inputs and outputs provide connections to and from the computing device, wherein the inputs are the signals or data received by the hearing testing device 434, and the outputs are the signals or data sent from the hearing testing device 434. In the following description, it should be appreciated that various inputs and outputs may be partially or fully integrated.

By way of example, with respect to inputs and outputs, the hearing testing device 432 may include the display 456, a user interface 460, a test frequency output 462, a headset output 464, a timer output 466, a handset input 468, a frequency range output 470, and a microphone input 472. The display 456 is an output device for visual information, including real-time or post-test screening results. The user interface 460 may provide a keyboard or push button for the operator of the hearing testing device 432 to provide input, including such functions as starting the screening, stopping the screening, and repeating a previously completed step. The test frequency output 462 may display the range to be examined, such as a frequency between 100 Hz and 5,000 Hz. The headset output 464 may output the signal under test to the patient. The timer output 466 may include an indication of the length of time the hearing testing device 432 will stay on a given frequency. For example, the hearing testing device 432 may stay 30 seconds on a particular frequency. The handset input 468 may be secured to a handset that provides "pause" and "okay" functionality for the patient during the testing. The frequency range output 462 may indicate the test frequency range per step, such as 50 Hz or other increment, for example. The microphone input 472 receives audio input from the operator relative to screening instructions intended for the patient, for example.

The memory 452 and the storage 454 are accessible to the processor 450 and include processor-executable instructions that, when executed, cause the processor 450 to execute a series of operations. With respect to processor-executable instructions, the processor-executable instructions may cause the processor 450 to permit the hearing testing device 432 to be conducted by one ear at a time. The processor-executable instructions may also cause the processor 450 to permit the patient to pause the process in response to a signal received at the handset input 468. As part of the processor-executable instructions, the processor 450, for example, may be caused to start the hearing testing device 432 at 50 Hz by giving a 100 Hz signal with harmonics as part of harmonic frequency series for a predetermined length of time, such as 20 seconds to 30 seconds at a specified decibel or decibel range. The processor-executable instructions may cause the processor 450 to receive a detection signal from the handset input 468 during screening. Then, the processor-executable instructions cause the hearing testing device 432 to test to the next frequency or frequencies in the applicable harmonic frequency series at as step, such as 200 Hz, for example, and continue the screening process. The system then determines a left ear preferred hearing range and a right ear preferred hearing range.

The processor-executable instructions presented hereinabove include, for example, instructions and data which cause a general purpose computer, special purpose computer, or special purpose processing device to perform a certain function or group of functions. Processor-executable instructions also include program modules that are executed by computers in stand-alone or network environments. Generally, program modules include routines, programs, components, data structures, objects, and the functions inherent in the design of special-purpose processors, or the like, that perform particular tasks or implement particular abstract data types. Processor-executable instructions, associated data structures, and program modules represent examples of the program code means for executing steps of the systems and methods disclosed herein. The particular sequence of such executable instructions or associated data structures represents examples of corresponding acts for implementing the functions described in such steps and variations in the combinations of processor-executable instructions and sequencing are within the teachings presented herein.

Figure 15:
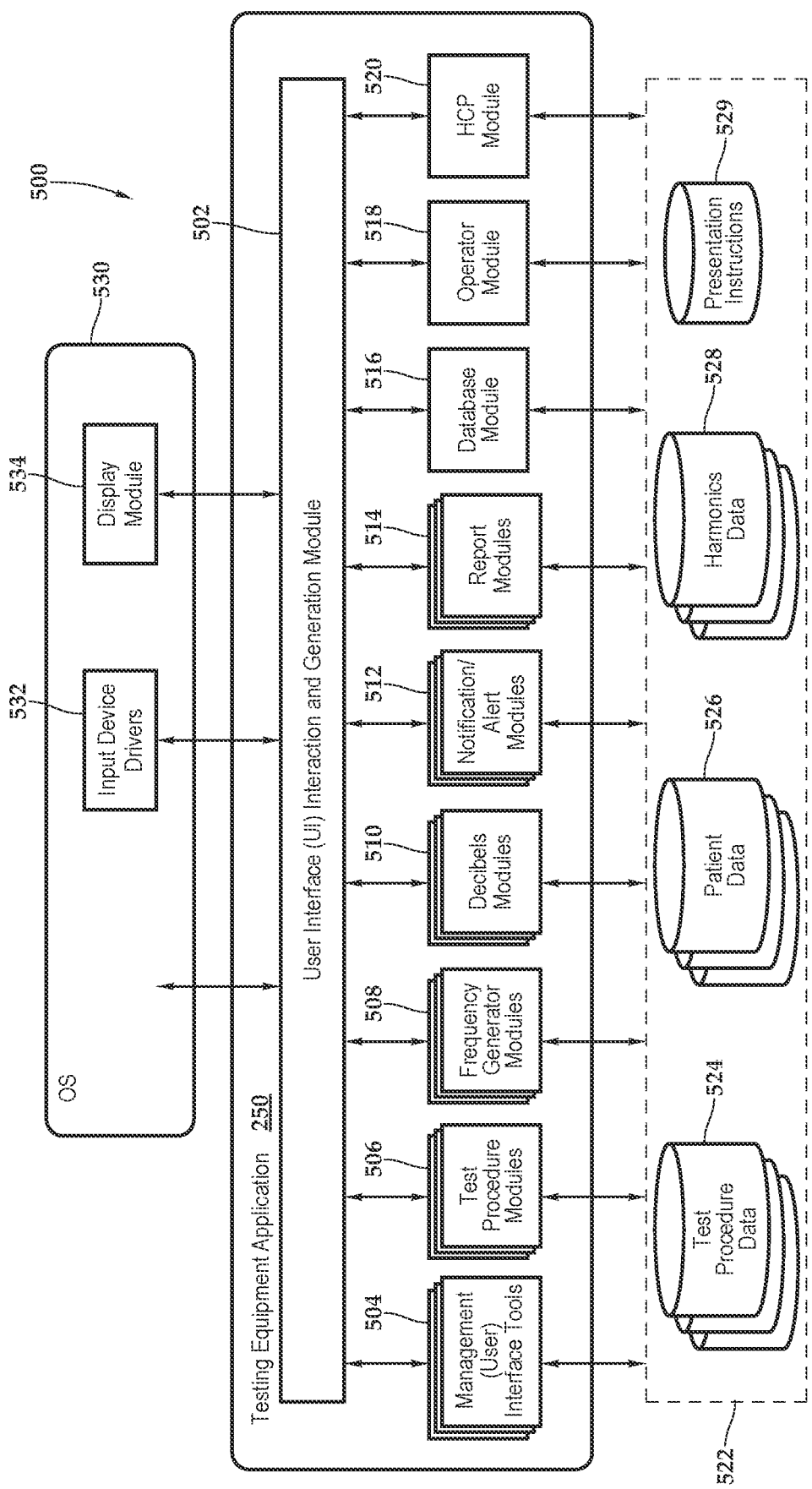
FIG. 15 is a conceptual module diagram depicting a software architecture of a testing equipment application of some embodiments.

Referring now to FIG. 15, conceptually illustrates the software architecture of a testing equipment application 500 of some embodiments that may determine the preferred hearing ranges for patients. In some embodiments, the testing equipment application 500 is a stand-alone application or is integrated into another application, while in other embodiments the application might be implemented within an operating system 530. Furthermore, in some embodiments, the testing equipment application 500 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The testing equipment application 500 includes a user interface (UI) interaction and generation module 502, management (user) interface tools 504, test procedure modules 506, frequency generator modules 508, decibels modules 510, notification/alert modules 512, report modules 514, database module 516, an operator module 518, and a health care professional module 520. The testing equipment application 500 has access to a testing equipment database 522, which in one embodiment, may include test procedure data 524, patient data 526, harmonics data 528, and presentation instructions 529. In some embodiments, storages 524, 526, 528, 529 are all stored in one physical storage. In other embodiments, the storages 524, 526, 528, 529 are in separate physical storages, or one of the storages is in one physical storage while the other is in a different physical storage.

Continuing to refer to FIG. 15, the system 300 identifies harmonic frequencies of a harmonic frequency series or of multiple harmonic frequency series that enables hearing. The system 300 is capable of combining various sounds, such as musical sounds or classical music instrument sounds, as discussed hereinabove, through a fundamental frequency and related frequencies of a harmonic frequency series or related frequencies of multiple harmonic frequency series, to creating or contribute to an algorithm that address or mitigate hearing loss for the patient. In fact, as presented herein, patients may be able to self-test or have minimal assistance during the testing.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for aiding hearing, the system comprising:
a programming interface configured to communicate with a device, the device including a housing securing a speaker, a user interface, a processor, non-transitory memory, and storage therein, the device including a busing architecture communicatively interconnecting the speaker, the user interface, the processor, the memory, and the storage;
the non-transitory memory accessible to the processor, the non-transitory memory including processor-executable instructions that, when executed, by the processor cause the system to:
screen, via the speaker and the user interface, a left ear of a patient with a plurality of harmonic frequencies of a harmonic frequency series, the harmonic frequency series being between 50 Hz and 10,000 Hz, the harmonic frequency series being a fundamental frequency and a plurality of integer multiples of the fundamental frequency;
determine a left ear preferred hearing range, the left ear preferred hearing range being a range of sound corresponding to highest hearing capacity of the left ear of the patient between 50 Hz and 10,000 Hz;
screen, via the speaker and the user interface, a right ear of a patient with a plurality of harmonic frequencies of a harmonic frequency series, the harmonic frequency series being between 50 Hz and 10,000 Hz, the harmonic frequency series being a fundamental frequency and a plurality of integer multiples of the fundamental frequency; and
determine a right ear preferred hearing range, the right ear preferred hearing range being a range of sound corresponding to highest hearing capacity of the right ear of the patient between 50 Hz and 10,000 Hz.

2. The system as recited in claim 1, wherein the right ear is screened prior to the left ear.

3. The system as recited in claim 1, wherein the harmonic frequency series further comprises musical sounds.

4. The system as recited in claim 1, wherein the harmonic frequency series further comprises classical music instrument sounds.

5. The system as recited in claim 1, wherein the harmonic frequency series further comprises classical music instrument sounds from an instrument selected from the group consisting of keyboard instruments, string instruments, woodwind instruments, and brass instruments.

6. The system as recited in claim 1, wherein, with respect to the screening of the left ear, the plurality of harmonic frequencies further comprises decreasing frequencies.

7. The system as recited in claim 1, wherein, with respect to the screening of the left ear, the plurality of harmonic frequencies further comprises increasing frequencies.

8. The system as recited in claim 1, wherein, with respect to the screening of the left ear, the plurality of harmonic frequencies further comprises a continuous sound.

9. The system as recited in claim 1, wherein, with respect to the screening of the left ear, the plurality of harmonic frequencies further comprises testing a single harmonic at a time.

10. The system as recited in claim 1, wherein, with respect to the screening of the left ear, the plurality of harmonic frequencies further comprises testing multiple harmonics at a time.

11. The system as recited in claim 1, wherein, with respect to the screening of the left ear, the plurality of harmonic frequencies further comprises testing at a constant amplification.

12. The system as recited in claim 1, wherein, with respect to the screening of the left ear, the plurality of harmonic frequencies further comprises testing at an increasing amplification.

13. The system as recited in claim 1, wherein the device further comprises a smart device.

14. The system as recited in claim 13, wherein the smart device further comprises a device selected from the group consisting of smart watches, smart phones, and tablet computers.

15. The system as recited in claim 1, wherein the device further comprises a computer.

16. The system as recited in claim 1, wherein the device further comprises a headset hearing tester.

17. The system as recited in claim 1, wherein the processor executable instructions further comprise processor executable instructions that, when executed, cause the processor to utilize distributed processing between the device and a server to screen, via the speaker and the user interface, the left ear of the patient.

18. The system as recited in claim 1, wherein the processor executable instructions further comprise processor executable instructions that, when executed, cause the processor to utilize distributed processing between the device and a server to screen, via the speaker and the user interface, each of the left ear of the patient and the right ear of the patient.

19. The system as recited in claim 1, wherein the processor executable instructions further comprise processor executable instructions that, when executed, cause the processor to execute hearing aid programming for each of the left ear and the right ear.

20. A system for aiding hearing, the system comprising:
a programming interface configured to communicate with a device, the device including a housing securing a speaker, a user interface, a processor, non-transitory memory, and storage therein, the device including a busing architecture communicatively interconnecting the speaker, the user interface, the processor, the memory, and the storage;
the non-transitory memory accessible to the processor, the non-transitory memory including processor-executable instructions that, when executed, by the processor cause the system to:
  screen, via the speaker and the user interface, a left ear of a patient with a plurality of harmonic frequencies of a harmonic frequency series, the plurality of harmonic frequencies being classical music instrument sounds, the harmonic frequency series being between 50 Hz and 10,000 Hz, the harmonic frequency series being a fundamental frequency and a plurality of integer multiples of the fundamental frequency;
  determine a left ear preferred hearing range, the left ear preferred hearing range being a range of sound corresponding to highest hearing capacity of the left ear of the patient between 50 Hz and 10,000 Hz;
  screen, via the speaker and the user interface, a right ear of a patient with a plurality of harmonic frequencies of a harmonic frequency series, the plurality of harmonic frequencies being classical music instrument sounds, the harmonic frequency series being between 50 Hz and 10,000 Hz, the harmonic frequency series being a fundamental frequency and a plurality of integer multiples of the fundamental frequency; and
  determine a right ear preferred hearing range, the right ear preferred hearing range being a range of sound corresponding to highest hearing capacity of the right ear of the patient between 50 Hz and 10,000 Hz.

21. A system for aiding hearing, the system comprising:
a programming interface configured to communicate with a device, the device including a housing securing a speaker, a user interface, a processor, non-transitory memory, and storage therein, the device including a busing architecture communicatively interconnecting the speaker, the user interface, the processor, the memory, and the storage;
the non-transitory memory accessible to the processor, the non-transitory memory including processor-executable instructions that, when executed, by the processor cause the system to:
  screen, via the speaker and the user interface, a left ear of a patient with a plurality of harmonic frequencies of a harmonic frequency series, the plurality of harmonic frequencies being classical music instrument sounds, the harmonic frequency series being between 50 Hz and 5,000 Hz, the harmonic frequency series being a fundamental frequency and a plurality of integer multiples of the fundamental frequency;
  determine a left ear preferred hearing range, the left ear preferred hearing range being a range of sound corresponding to highest hearing capacity of the left ear of the patient between 50 Hz and 5,000 Hz;
  screen, via the speaker and the user interface, a right ear of a patient with a plurality of harmonic frequencies of a harmonic frequency series, the plurality of harmonic frequencies being classical music instrument sounds, the harmonic frequency series being between 50 Hz and 5,000 Hz, the harmonic frequency series being a fundamental frequency and a plurality of integer multiples of the fundamental frequency; and
  determine a right ear preferred hearing range, the right ear preferred hearing range being a range of sound corresponding to highest hearing capacity of the right ear of the patient between 50 Hz and 5,000 Hz.

* * * * *